(12) United States Patent
Knaappila

(10) Patent No.: US 11,350,275 B2
(45) Date of Patent: *May 31, 2022

(54) SYSTEMS AND METHODS FOR INITIAL AUTHENTICATION OF WIRELESS COMMUNICATION

(71) Applicant: Silicon Laboratories Inc., Austin, TX (US)

(72) Inventor: Jani K. Knaappila, Evitskog (FI)

(73) Assignee: Silicon Laboratories Inc., Austin, TX (US)

( * ) Notice: Subject to any disclaimer, the term of this patent is extended or adjusted under 35 U.S.C. 154(b) by 187 days.

This patent is subject to a terminal disclaimer.

(21) Appl. No.: 16/559,220

(22) Filed: Sep. 3, 2019

(65) Prior Publication Data

US 2019/0394645 A1    Dec. 26, 2019

Related U.S. Application Data

(63) Continuation of application No. 15/387,004, filed on Dec. 21, 2016, now Pat. No. 10,440,570.

(51) Int. Cl.
*H04W 12/06* (2021.01)
*H04W 12/08* (2021.01)
(Continued)

(52) U.S. Cl.
CPC ............ *H04W 12/06* (2013.01); *G06F 21/31* (2013.01); *H04W 4/80* (2018.02); *H04W 12/08* (2013.01);
(Continued)

(58) Field of Classification Search
CPC ....... H04W 12/06; H04W 76/14; H04W 4/80; H04W 12/08; G06F 21/31; G06F 2221/2111
See application file for complete search history.

(56) References Cited

U.S. PATENT DOCUMENTS 5,148,180 A    9/1992  Beyer et al.
5,973,643 A *  10/1999 Hawkes ................ H04W 64/00
                                                     455/456.5
(Continued)

FOREIGN PATENT DOCUMENTS

CN    102572780    7/2012
CN    104853352    8/2015

OTHER PUBLICATIONS

Xiong, J. and Jamieson, K., Sep. 2013. Securearray: Improving wifi security with fine-grained physical-layer information. In Proceedings of the 19th annual international conference on Mobile computing & networking (pp. 441-452). (Year: 2013).*

(Continued)

*Primary Examiner* — James R Turchen
(74) *Attorney, Agent, or Firm* — Egan, Enders & Huston LLP.

(57) ABSTRACT

Systems and methods are provided that may be implemented to use angle of arrival (AoA) of a signal transmitted between two Bluetooth Low Energy (BLE) wireless devices to initially authenticate a connection between the two BLE devices. In one example, bonding or pairing with a first BLE device may be restricted to only those other BLE devices having an antenna currently positioned to transmit a signal to the first BLE device from an allowed direction and within a predefined permitted range of AoA relative to the first BLE device.

24 Claims, 9 Drawing Sheets

(51) Int. Cl.
  *H04W 76/14* (2018.01)
  *H04W 4/80* (2018.01)
  *G06F 21/31* (2013.01)
  *H04W 12/50* (2021.01)
  *H04W 12/64* (2021.01)
  *H04W 4/02* (2018.01)

(52) U.S. Cl.
  CPC .......... *H04W 12/50* (2021.01); *H04W 12/64* (2021.01); *H04W 76/14* (2018.02); *G06F 2221/2111* (2013.01); *H04W 4/023* (2013.01)

(56) References Cited

U.S. PATENT DOCUMENTS

| | | | |
|---|---|---|---|
| 6,525,685 B1* | 2/2003 | Rose | G01S 13/4418 342/159 |
| 8,625,796 B1* | 1/2014 | Ben Ayed | H04L 63/0861 380/258 |
| 8,723,729 B2 | 5/2014 | Desai et al. | |
| 8,965,284 B2 | 2/2015 | Honkanen et al. | |
| 9,075,979 B1* | 7/2015 | Queru | H04W 64/00 |
| 9,194,168 B1* | 11/2015 | Lu | G01C 21/26 |
| 9,355,231 B2* | 5/2016 | Disraeli | H04L 63/083 |
| 9,769,662 B1* | 9/2017 | Queru | H04L 63/105 |
| 9,813,906 B2* | 11/2017 | John Archibald | H04L 63/0861 |
| 9,961,543 B2* | 5/2018 | Zhang | H04W 12/08 |
| 10,440,570 B2 | 10/2019 | Knaappila | |
| 2003/0069024 A1* | 4/2003 | Kennedy, Jr. | H04W 64/00 455/457 |
| 2004/0203862 A1* | 10/2004 | Wood | H04L 63/08 455/422.1 |
| 2007/0025265 A1* | 2/2007 | Porras | H04W 12/122 370/252 |
| 2009/0063852 A1* | 3/2009 | Messerges | H04L 9/3263 713/156 |
| 2010/0302102 A1* | 12/2010 | Desai | G01S 3/50 342/417 |
| 2013/0045759 A1* | 2/2013 | Smith | H04W 4/023 455/456.6 |
| 2013/0188538 A1* | 7/2013 | Kainulainen | G01S 5/04 370/310 |
| 2013/0247194 A1* | 9/2013 | Jha | H04W 12/122 726/23 |
| 2014/0040985 A1* | 2/2014 | Wang | H04W 12/065 726/3 |
| 2014/0113591 A1* | 4/2014 | Takai | H04W 12/50 455/411 |
| 2014/0157381 A1* | 6/2014 | Disraeli | H04L 63/0853 726/7 |
| 2014/0321321 A1 | 10/2014 | Knaappila | |
| 2014/0327581 A1* | 11/2014 | Murphy | G01S 5/08 342/417 |
| 2014/0361872 A1* | 12/2014 | Garcia | H04B 5/0031 340/5.74 |
| 2015/0192656 A1* | 7/2015 | Werner | G01S 3/46 342/442 |
| 2015/0215762 A1* | 7/2015 | Edge | H04W 8/005 370/338 |
| 2015/0271628 A1 | 9/2015 | Knaappila | |
| 2015/0281955 A1 | 10/2015 | Zhang | |
| 2015/0319600 A1 | 11/2015 | Knaappila | |
| 2015/0356563 A1* | 12/2015 | Vohra | G06Q 20/40145 705/44 |
| 2016/0105761 A1* | 4/2016 | Polo | H04W 4/80 455/41.2 |
| 2016/0272154 A1* | 9/2016 | Sanji | B60R 25/24 |
| 2016/0370450 A1* | 12/2016 | Thorn | G01S 5/08 |
| 2017/0099576 A1* | 4/2017 | El-Sallabi | H04W 12/06 |
| 2017/0108579 A1* | 4/2017 | Irvine | G01S 5/08 |
| 2017/0147959 A1* | 5/2017 | Sweeney | G06Q 10/063114 |
| 2017/0185991 A1* | 6/2017 | Park | G06Q 20/351 |
| 2017/0195826 A1* | 7/2017 | Shaikh | H04L 63/105 |
| 2017/0201859 A1* | 7/2017 | Banerjea | H04B 7/086 |
| 2017/0215039 A1* | 7/2017 | Amizur | H04W 4/33 |
| 2017/0285171 A1* | 10/2017 | Ries | H04K 1/00 |
| 2017/0303071 A1* | 10/2017 | Haverinen | H04B 17/27 |
| 2017/0318098 A1* | 11/2017 | Sanghvi | H04L 67/16 |
| 2018/0049106 A1 | 2/2018 | Knaappila | |
| 2018/0076875 A1* | 3/2018 | Haverinen | G01S 3/28 |
| 2018/0081025 A1* | 3/2018 | Jonsson | G01S 3/46 |
| 2018/0152917 A1* | 5/2018 | Knaappila | H04W 76/10 |

OTHER PUBLICATIONS

Xiong, J. and Jamieson, K., Oct. 2010. SecureAngle: improving wireless security using angle-of-arrival information. In Proceedings of the 9th ACM SIGCOMM Workshop on Hot Topics in Networks (pp. 1-6). (Year: 2010).*

Balmus, "Bluetooth Low Energy SMP Pairing", Nov. 20, 2016, 6 pgs.

Bluetooth, "Security, Bluetooth Low Energy", Bluetooth SIG, Obtained from Internet on Nov. 20, 2016, 5 pgs.

Gunhardson, "Indoor Positioning Using Angle of Departure Information", 2015, 86 pgs.

Tessel, "Getting Started With BLE & Tessel", Aug. 2014, 16 pgs.

Dhope, "Application of Music, Esprit and Root Music in DOA Estimation", University of Zagreb, 2010, 5 pgs.

Xiong et al., "SecureAngle: Improving Wireless Security Using Angle of Arrival Information", ACM, 2010, 6 pgs.

Gotsis et al., "Multiple Signal Direction of Arrival (DOA) Estimation for a Switched Beam System Using Neural Networks", Piers Online, vol. 3, No. 8, 2007, 5 pgs.

Gustafsson et al., "Positioning Using Time Difference of Arrival Measurements", Department of Electrical Engineering, Linkoping University, 4 pgs., (This reference was available prior to the filing date of the current patent application).

Abdelaziz et al., "Message Authentication and Secret Key Agreement in Vanets via Angle of Arrival", arXiv Preprint arXiv;1609.03109; 2016, 8 pgs.

Klugman et al., "Bluetooth LE 4.0 and 4.1 (BLE)", Apr. 23, 2014, 47 pgs.

* cited by examiner

SYSTEMS AND METHODS FOR INITIAL AUTHENTICATION OF WIRELESS COMMUNICATION

This application is a continuation of U.S. patent application Ser. No. 15/387,004, filed on Dec. 21, 2016 and entitled "Systems And Methods For Initial Authentication Of Wireless Communication", which is incorporated herein by reference in its entirety for all purposes.

FIELD

The disclosed systems and methods relate to wireless communication and, more particularly, to initial authentication for wireless communication between wireless devices.

BACKGROUND

Bluetooth Low Energy (BLE) relates to Bluetooth wireless radio technology. It has been designed for low-power and low latency applications for wireless devices within short range. Today, BLE applications can be found from healthcare, fitness, security, smart energy, industrial automation and home entertainment. However, BLE is not limited only those, but increasingly more new application utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

In BLE technology, one or more so called slave devices can be connected to a master device. To let the master know about the slave devices before connection, the slave devices (or at that point "advertisers") periodically, at pseudo-random intervals, pass advertisement packets which the master device (also known as scanner device, i.e. "scanner") is scanning. Depending on the type of advertisement packet sent by an advertiser device, the scanner device may respond to the received advertisement packet by requesting a connection with the advertiser device, or may respond by requesting further information from the advertiser device. Beacons are a particular type of BLE advertiser device that transmit advertisement packets with a unique identifier to nearby portable electronic devices such as smart phones. An application on a portable electronic device may respond to information within an advertisement packet received from a beacon by performing an action, such as approximating the location of the portable device. After an advertiser device and scanner device become connected as master and slave, the master device may request bonding with the slave device. This means that the devices exchange long term keys or other encryption info to be stored for future connections. In another case, the master device may request pairing with the slave device, in which case the connection may be encrypted only for the duration of the current connection, during which short term keys are exchanged between the master device and slave device.

Restricting access to a wireless device for bonding or pairing purposes is usually accomplished by initial password authentication. In some cases, a password code is visibly printed onto an outside surface of the wireless device to be accessed. In such a case, a user desiring initial access to that wireless device needs to have visual access to the wireless device in order to see the printed password code on the device. The user may then input that visible code into another (accessing) device to allow the connection process. Other ways to restrict access to a wireless device for bonding or pairing purposes is to require a user to press a button or touch a display on the wireless device to be accessed, or to use another channel to transfer information to the wireless being accessed. However, such authentication technologies add cost & size to the wireless device. Yet another way of restricting access to a wireless device employs received signal strength (RSSI)-based filtering in an attempt to ensure that an accessing device has close proximity to the accessed device. However, RSSI is not always an accurate measure of device proximity since strong radio signals may sometimes be received from wireless devices that are outside the desired threshold distance range for allowing authentication.

SUMMARY

Disclosed herein are systems and methods that may be implemented to use angle of arrival (AoA) of a signal transmitted between two (RF)-enabled wireless devices (e.g., such as a BLE modules) to initially authenticate a connection between the two wireless devices. In this way, bonding or pairing with a first wireless device may be restricted to only those other wireless devices having an antenna currently positioned to transmit a signal to the first wireless device from an allowed direction and within a predefined permitted range of AoA relative to the first wireless device. This capability may be implemented in one embodiment to help assure that the first wireless device is only pairing or bonding with another wireless device that is selected by a user, while at the same time preventing the first wireless device from undesirably pairing or bonding with other non-selected wireless device/s that may also be present and within wireless communication range. In a further embodiment, the disclosed systems and methods may be implemented to provide ease of use for a user operating a first wireless device by allowing the user to initially authenticate a bonded or paired connection between the first wireless device and a second wireless device without requiring the user to have physical access to the second wireless device and/or to input any password into the first wireless device during initial connection.

In one embodiment, the disclosed systems and methods may be implemented in a first wireless device to allow initial authentication and pairing or bonding with any other wireless device as long as the pairing/bonding request from the other wireless device is received from an AoA that is less than or equal to an allowed or permitted AoA defined relative to a predetermined reference vector ($\vec{n}$) that corresponds to the orientation of the first wireless device. In this embodiment, only pairing/bonding request signals received from a predefined range of AoA values are allowed, although an allowable pairing/bonding request signal may be received from any other wireless device that is positioned to transmit the pairing/bonding request from the proper angle. In a further embodiment, the allowed or permitted AoA may only be required for initial authentication of a connection, i.e., once initial authentication (e.g., pairing or bonding) has taken place, the authenticated connection may be maintained even when the other wireless device is repositioned to transmit signals to the first wireless device from an AoA that is not within the allowed or permitted AoA. In a further exemplary embodiment, no user password entry (or other user authentication action) may be required for establishing an authenticated connection other than correct positioning of the requesting wireless device so that its pairing or bonding request is received at the first wireless device from an allowable AoA. However, in another embodiment, user passwords or other authentication actions (e.g., requiring user to press button on the target device, separate wireless channel communication between target and requesting/accessing devices, RSSI-based filtering or other proximity filter for the requesting/accessing devices, etc.) may be additionally required to authenticate a requesting or accessing device for authenticated wireless communication with a target device if so desired.

Thus, the disclosed systems and methods may be implemented in one embodiment to simplify pairing and/or bonding between wireless devices, and also to help assure that a wireless user device is directionally pairing or bonding with the desired target wireless device rather than another non-desired wireless-enabled device, e.g., such as in a wireless communication environment where multiple connectable wireless devices are simultaneously operating within wireless communication range of the wireless user device and would otherwise pose the risk of pairing/bonding with the wrong wireless device.

In one exemplary embodiment, the disclosed systems and methods may be implemented to control authentication and communication between a scanner/master device (e.g., such as a BLE-enabled smart phone) and multiple advertiser/slave devices (e.g., such as individual BLE-enabled ceiling light devices) that are operating together in the same wireless communication environment. In this regard, the disclosed systems and methods may be implemented to achieve an authenticated connection with a selected advertiser device (e.g., a ceiling light immediately above the scanner device) while at the same time preventing bonding or pairing with the other non-selected advertiser devices (e.g., the other ceiling lights in the room) that are currently in wireless communication range. In such an embodiment, a user may position the scanner device within the permitted range of AoA relative to a selected advertiser device to achieve a paired or bonded connection with the selected advertiser device (i.e., as a master device to a slave device), while the scanner device is positioned outside the permitted range of AoA relative to the other advertiser devices. In a further embodiment, once an authenticated connection has been established between a slave device and a master device as descried above, this authenticated connection may be maintained or continued between the master and slave devices, even when the transmitting antenna of the now-connected master device is moved to a position to transmit signals that are no longer received within the permitted range of AoA of the slave device.

In one respect, disclosed herein is a method, including using at least one programmable integrated circuit of a first wireless device to determine whether to initially authenticate a wireless connection with a second wireless device based on a comparison between an angle of arrival (AoA) of a first wireless signal received from the second wireless device to a predefined range of allowable AoA values; and then to establish an authenticated wireless connection between the first and second wireless device only if it is determined to initially authenticate the wireless connection with the second wireless device.

In another respect, disclosed herein is an apparatus, including at least one programmable integrated circuit coupled to radio circuitry and configured to be coupled to an antenna as a first wireless device, the at least one programmable integrated circuit being programmed to: determine whether to initially authenticate a wireless connection with a second wireless device based on a comparison between an angle of arrival (AoA) of a first wireless signal received from the second wireless device to a predefined range of allowable AoA values; and then to establish an authenticated wireless connection between the first and second wireless device only if it is determined to initially authenticate the wireless connection with the second wireless device.

In another respect, disclosed herein is a system, including: a first wireless device and a second wireless device, the first wireless device including at least one programmable integrated circuit coupled to radio circuitry and an antenna, and the second wireless device including at least one programmable integrated circuit coupled to radio circuitry and an antenna. The at least one programmable integrated circuit of the second wireless device may be programmed to transmit a first wireless signal to the first wireless device; and the at least one programmable integrated circuit of the first wireless device may be programmed to: determine whether to initially authenticate a wireless connection with the second wireless device based on a comparison between an angle of arrival (AoA) of the first wireless signal received from the second wireless device to a predefined range of allowable AoA values, and then to establish an authenticated wireless connection between the first and second wireless device only if it is determined to initially authenticate the wireless connection with the second wireless device.

DESCRIPTION OF ILLUSTRATIVE EMBODIMENTS

Figure 1:
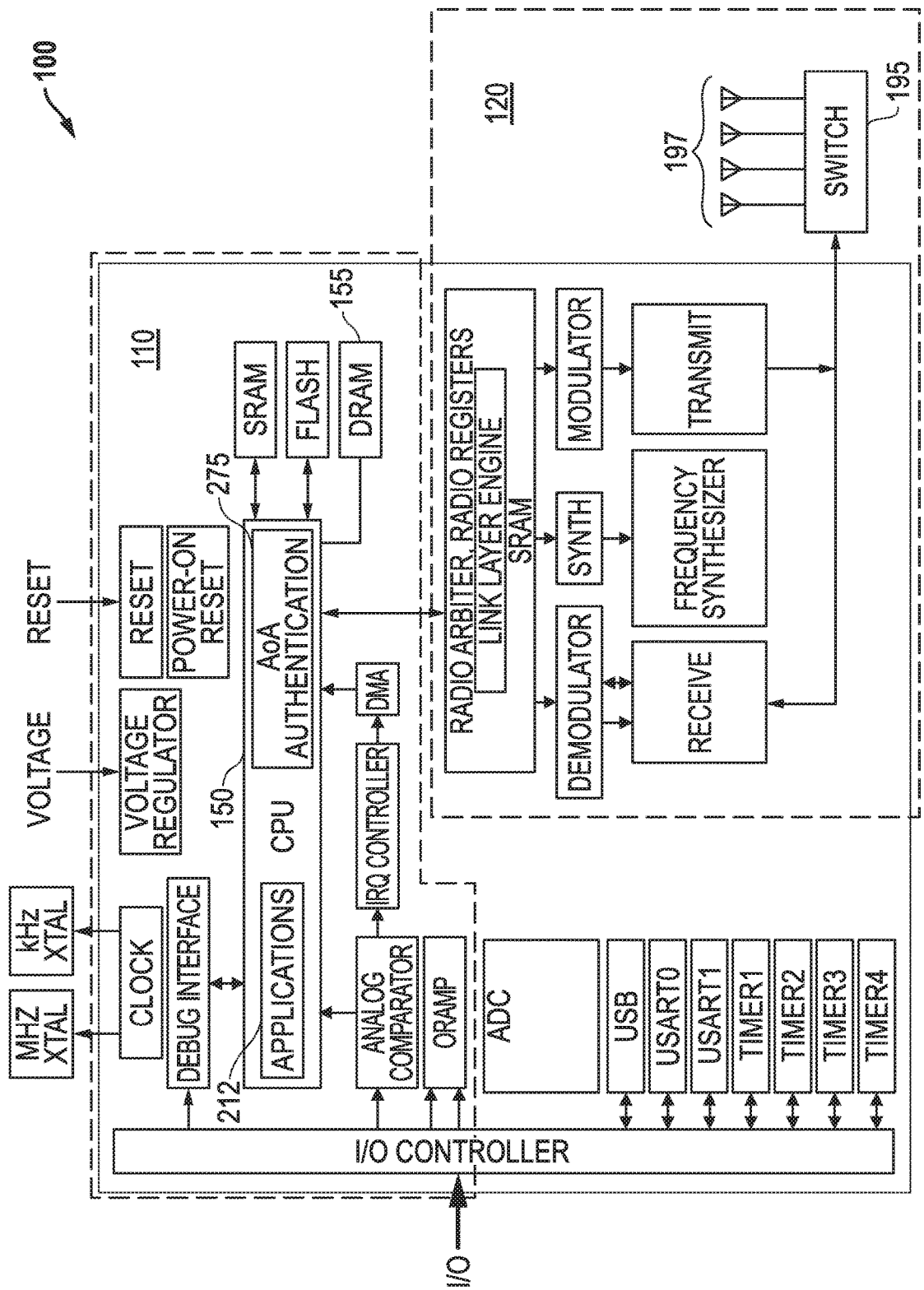
FIG. 1 illustrates a simplified block diagram of a wireless device according to one exemplary embodiment of the disclosed systems and methods.

FIG. 1 illustrates a simplified block diagram of an exemplary wireless device in the form of a BLE module 100 that may be employed to implement the disclosed systems and methods. As shown, BLE module 100 includes a first module segment 110 that includes one or more central processing units (CPUs), processors or other programmable integrated circuits 150 and memory 155 (e.g., DRAM) with application data. As shown application/s 212 may be executed by CPU 150 to provide multiple different resources (e.g., such as different Bluetooth services, security manager, parts of a Bluetooth service such as Bluetooth service characteristics, and/or any other computing or wireless operation services) to other connecting RF-enabled devices across different wireless connections (e.g., such as different BLE wireless connections between different BLE devices). Angle of arrival (AoA) authentication 275 may be executed by CPU 150, for example, to restrict bonding or pairing with other BLE devices to only those other BLE devices transmitting a signal to the first BLE device from an allowed direction and within a predefined permitted range of AoA relative to the first BLE device in a manner as described further herein.

Still referring to FIG. 1, a second module segment 120 is configured to implement a part of a link layer and physical layer for radio module 100, and includes radio components and circuitry such as radio registers, link layer engine, modulator-demodulator, receiver and transmitter (transceiver), frequency synthesizer, balancing-unbalancing unit ("balun"), one or more antennas ("ant/s"). In one embodiment, second module segment 120 may include memory and one or more microcontrollers, processors, programmable logic devices (PLDs), or other programmable integrated circuits programmed or otherwise configured to execute one or more components of module segment 120, e.g., such as a link layer engine.

In one embodiment, second module segment 120 may be configured to determine angle of arrival (AoA) of a signal received from another device (e.g., such as a BLE device). For example, multiple antenna elements of second module segment 120 may be configured as a switched antenna array 197 or other suitable type of direction finding array that is coupled to processing components of second module 120 that are programmed to determine AoA of a signal received from another device by measuring amplitude and/or phase of the signal at each antenna element in the antenna array. In one embodiment, angle of arrival (AoA) of a signal received from another device may be so determined using only a single antenna array 197 having multiple antenna elements as illustrated and described in relation to FIG. 4A. In another exemplary embodiment illustrated and described in relation to FIG. 4B, processing components of second module 120 may be programmed to determine AoA of a signal received from another device based on a determined angle of departure (AoD) of the received signal from the other device.

In one exemplary embodiment, processing components (e.g., such as demodulator or receiver component of baseband processor 234) of second module 120 may be configured to sample a received signal and to perform AoA determination 285. In this regard, AoA of the received signal may be determined using any suitable technique, e.g., such as by using time difference of arrival (TDOA) techniques to measure the delay, or to measure difference in received phase, of the received signal at each antenna element in the antenna array relative to another antenna element/s in the antenna array and which may include, for example, using switch 195 to switch through the different elements of the array. At least a portion of such a received signal may be constant frequency to aid measurement of phase shift or TDOA between antenna elements of the array as will be described further herein. In some embodiments direction of arrival (DOA) processing techniques such as MUltiple Signal Classification (MUSIC), Estimation of Signal Parameters Via Rotational Invariance Techniques (ESPRIT), etc. may be employed depending on the particular system configuration. It will be understood that in one embodiment, phase shift of a received signal may be performed by demodulator or receiver of baseband processor 234, and this determined phase shift information then passed upwards to a higher layer of BLE module 100 for AoA determination.

In one embodiment the one or more programmable integrated circuits, memory, and clock circuitry of module segment 110 may be coupled to each other and to components of module segment 120 through a system bus interconnect or one or more other types of suitable communication media, including one or more electrical buses and/or intervening circuitry that provides electrical communications. In certain embodiments, memory of module segments 110 and 120 may contain instructions which, when executed by programmable integrated circuits of BLE module 100, enable the BLE module 100 to operate as a BLE device to perform the functions described herein. Memory of BLE module 100 may be implemented, for example, using one or more non-volatile memories (e.g., FLASH read-only-memories (ROMs), electrically programmable ROM (EPROMs), and/or other non-volatile memory devices) and/or one or more volatile memories (e.g., dynamic random access memories (DRAMs), static random access memories (SRAM) and/or other volatile memory devices).

Second module segment 120 includes circuitry that operates as a wireless interface for first module segment 110 and that is coupled to one or more antennas as shown. Second module segment 120 may include a radio that includes baseband processing, MAC (media access control) level processing, beamforming or TDOA processing, and/or other physical layer processing for BLE packet communications. The programmable integrated circuits of first module segment 110 and second module segment 120 may also read and write from the various system memory during operations, for example, to store packet information being received from or transmitted to another BLE device. Although not shown, BLE module 120 may also be coupled receive power from a power supply, which may be a battery or a connection to a permanent power source such as a AC mains wall outlet.

Figure 2:
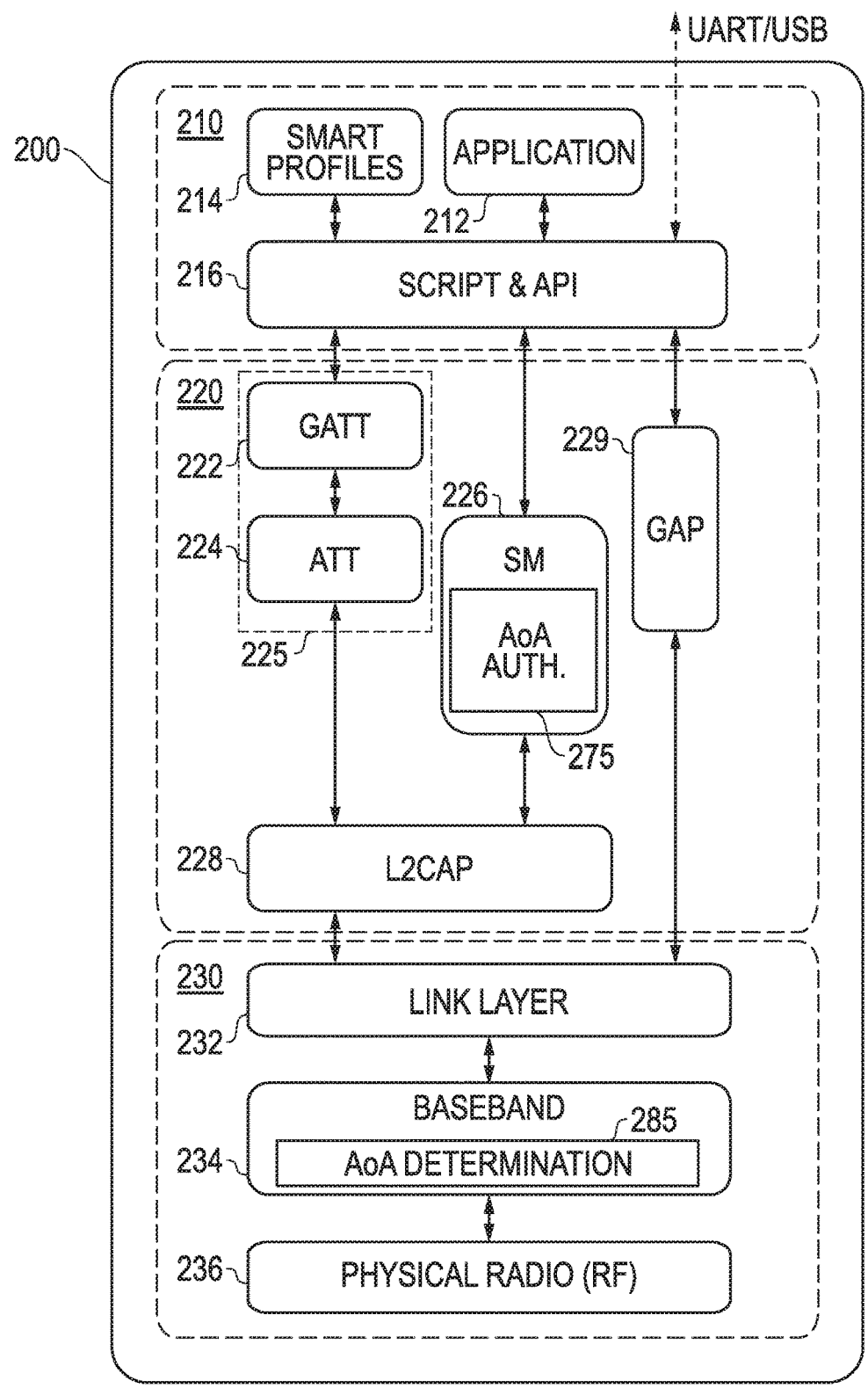
FIG. 2 is a simplified illustration of components of a Bluetooth smart module according to one exemplary embodiment of the disclosed systems and methods.

FIG. 2 is a simplified illustration of application, host and BLE control components of a Bluetooth smart module 200 configured according to one exemplary embodiment of the disclosed systems and methods. Although a Bluetooth smart module is illustrated, it will be understood that the disclosed systems and methods may be implemented with any other RF communication technology that employs authentication to establish an authenticated connection between separate wireless devices prior to allowing specified types of wireless data or information to be communicated (e.g., via pairing and/or bonding) between the separate wireless devices. Examples of such other RF communication technologies include, but are not limited to, IEEE 802.15.4 (ZigBee), IEEE 802.11 (Wi-Fi), etc. Components of Bluetooth smart module 200 may be implemented, for example, using the hardware components of radio module 100 or any other suitable combination of radio hardware components.

As shown in FIG. 2, Bluetooth smart module 200 of this embodiment includes application layer 210, host layer 220 and a Bluetooth (or BLE) controller 230. Application layer 210 may include, for example, apparatus-related application/s 212 (e.g., heart rate, proximity, blood pressure, time update, temperature, battery, lighting control, home automation control, etc.), smart profiles 214, and script and application programming interface (API) 216. Host layer 220 includes protocols running over the connection. Host layer 220 also includes data to be used in advertisement profile or Generic Attribute Profile (GATT) 222, generic access profile (GAP) 229, attribute protocol (ATT) 224, security manager (SM) 226 and logical link control and adaptation protocol (L2CAP) 228. Together GATT 222 and ATT 224 provide services 225 for Bluetooth smart module 200 that define an interface with other BLE devices connected to Bluetooth smart module 200 for reading and/or writing data for applications 212. SM 226 is configured to utilize security manager protocol to manage authentication and encryption for pairing and bonding with other BLE devices, including generation and storage of encryption keys. As illustrated, SM 226 may also be configured in this embodiment to manage AoA authentication for connections with other BLE devices as described further herein. For example, SM 226 may compare a determined AoA value ($\alpha$) for a signal received from another BLE device to a predefined range of allowable AoA values to determine if the other BLE device should be authenticated for pairing or bonding with Bluetooth smart module 200.

As further shown in FIG. 2, Bluetooth (or BLE) controller 230 also includes link layer 232, baseband 234, and physical layer 236 (i.e., physical radio, radio frequency RF). Link layer 232 is present to provide ultra-low power idle mode operation and device discovery (i.e., connection mode and advertising mode handling). Link layer 232 is also configured to control packet transmission and response. Link layer 232 may be configured to support one or more connections or may in one embodiment be configured with multiple virtual link layers that are simultaneously operating, and a scheduler that is configured to control access of the virtual link layers to common radio resources of physical layer 236 through baseband 234 in a manner described in U.S. patent application Ser. No. 15/234,332 filed Aug. 11, 2016, which is incorporated herein by reference in its entirety for all purposes.

As further shown in FIG. 2, BLE controller 230 (e.g., baseband 234) may be configured in one embodiment to determine AoA ($\alpha$) of a signal received from another BLE device that is requesting pairing or bonding with Bluetooth smart module 200 in a manner as described further herein. Baseband 234 may then pass this determined AoA value ($\alpha$) to SM 226 of host layer 220 for use with (e.g., comparison to) a predefined range of allowable AoA values for initial AoA authentication. As described further herein, a predefined range of allowable AoA values may in one embodiment be defined by a value of maximum allowable AoA ($\beta$) relative to a reference vector extending from a wireless device. Baseband 234 may also be responsible for retrieving (e.g., from non-volatile memory) or otherwise accessing the predefined range of allowable AoA values (e.g., such as a value of maximum allowable AoA ($\beta$)) and passing this information to SM 226 for this purpose. In this exemplary embodiment, a vector is used to represent direction, and vector operations are used for calculation of angles. However, it will be understood that in other embodiments an angle (e.g., AoA, range of allowable AoA values, etc.) may be represented and/or calculated using any other suitable mathematical measurements and operations (e.g., using Cartesian, polar or other coordinates, Euler angles, rotation matrix, quaternions, sphere-sphere intersections, in-phase and quadrature components, etc.).

In one embodiment, application layer 210 of FIG. 2 may be capable of reading sensor data (e.g., from heart rate sensor, proximity sensor, temperature sensor, etc.), and reporting the data to host layer 220 for transmission using Bluetooth (or BLE) controller 230 from Bluetooth smart module 200 to one or more other BLE-enabled devices across one or more connections. In another embodiment, application layer 210 of Bluetooth smart module 200 may be additionally or alternatively capable of exchanging (receiving or transmitting) data, control and/or configuration information through host layer 220 and BLE controller 230 with other BLE-enabled devices across one or more connections. Although exemplary embodiments are illustrated and described herein in relation to Bluetooth smart module 200 of FIG. 2, it will be understood that the disclosed systems and methods may be implemented to determine AoA and perform AoA authentication using any other wireless device configuration, e.g., AoA determination and authentication may alternatively both be performed by BLE controller 230 of Bluetooth smart module 200, e.g., using Baseband 234. Moreover, it will be understood that the disclosed systems and methods may be implemented for initial authentication with any other type of wireless-enabled device that is configured to perform authentication to establish an authenticated connection with another separate wireless-enabled device prior to allowing specified types of wireless data or information to be communicated (e.g., via pairing or bonding) between the separate wireless devices.

Figure 3:
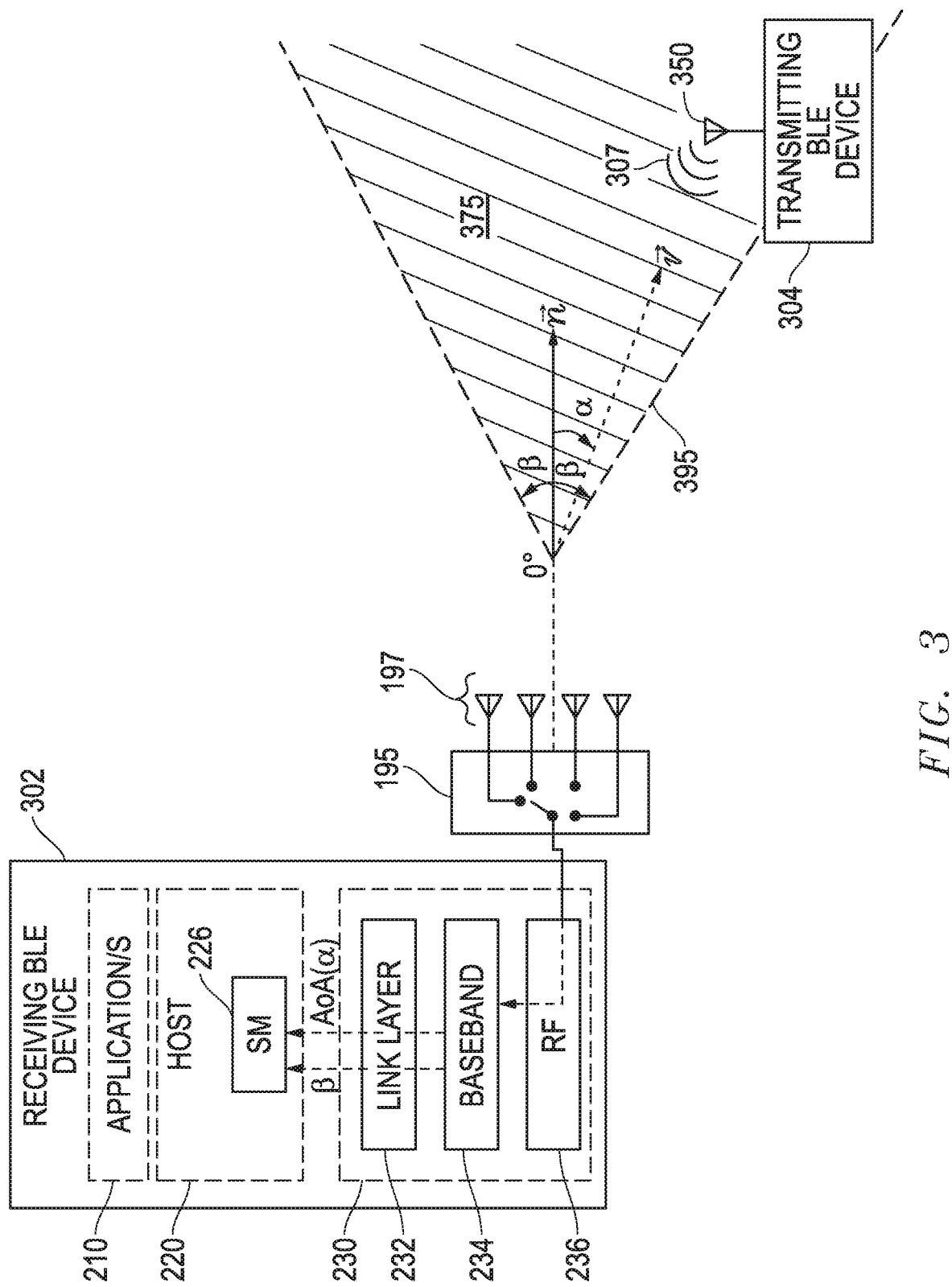
FIG. 3 illustrates a BLE device that is receiving a BLE signal transmitted from another BLE device according to one exemplary embodiment of the disclosed systems and methods.

FIG. 3 illustrates one exemplary embodiment of a receiving BLE device 302 that includes components of a Bluetooth smart module 200, including an antenna array 197 that is receiving a BLE signal 307 transmitted from the antenna 350 of another transmitting BLE device 304 that is located within wireless communication signal range of BLE device 302. It will be understood that for purposes of discussion, the term "transmitting device" is used herein to identify a BLE device that is currently transmitting a RF signal to another BLE device identified herein as a "receiving device", where the angle of arrival (AoA) of this transmitted RF signal at the receiving device is to be determined for purposes of initial authentication between the two devices according to the embodiments described herein.

Figure 4A:
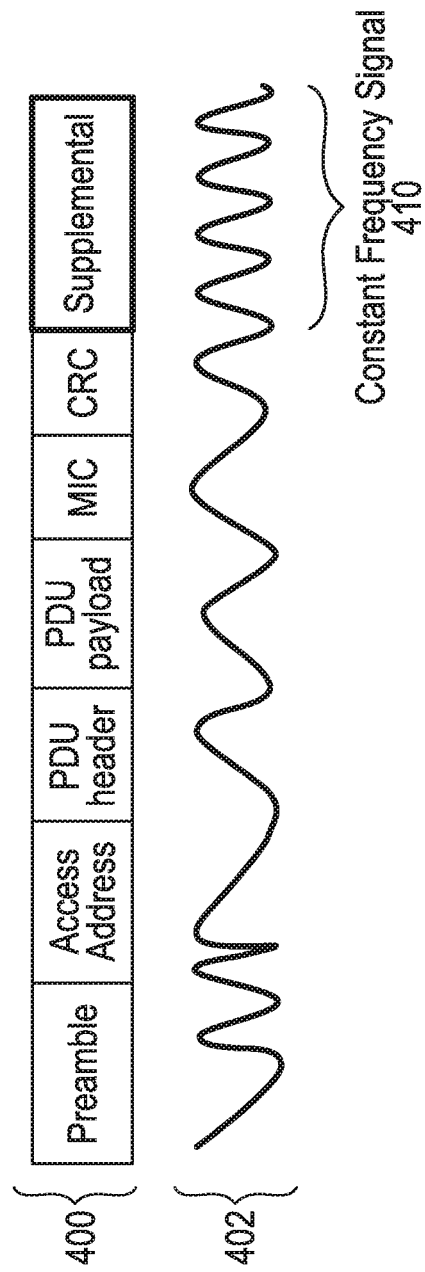
FIG. 4A shows a Bluetooth radio packet that may be employed in the practice of one exemplary embodiment of the disclosed systems and methods.

In one embodiment, receiving BLE device 302 may be a fixed slave device (e.g., such as a BLE-enabled and controllable lighting fixture) that has received or is receiving a pairing or bonding request via BLE signal 307 from a connected mobile transmitting device 304 (e.g., BLE-enabled smart phone, tablet, handheld remote control, notebook computer, etc.). In one embodiment, BLE signal 307 may contain a Bluetooth (BLE) radio packet 400 that includes a constant frequency signal 410 at the end of the packet waveform 402 as illustrated in FIG. 4A. Antenna switch 195 may switch between the individual antenna elements of array 197 (e.g., in round robin fashion) during the duration of the constant frequency signal 410 so as to provide the received constant frequency signal 410 from one element at time of array 197 to RF physical layer 236 and then to baseband 234 as shown.

Referring to FIG. 4A, antenna elements of array 197 may be provided with known spacing from each other such that the difference in the measured phase (or phase shift) or time of arrival of constant frequency signal 410 as it is received at the different elements is indicative of the vector ($\vec{v}$) of the arriving signal 307 relative to a reference vector ($\vec{n}$) which may be used to define the orientation of receiving device 302. In such an embodiment, reference vector ($\vec{n}$) corresponds to the current orientation of a given BLE device 302 to which the direction of an incoming received signal is to be compared. For example, reference vector ($\vec{n}$) may be a fixed vector that corresponds to the centerline of the outgoing light beam emitted from a BLE-enabled overhead light fixture that includes BLE device 302, or may be a vector that extends outward from (and perpendicular to) the front surface of a refrigerator, etc. In this regard, it will be understood that a reference vector ($\vec{n}$) may be defined as desired to extend relative to the BLE device 302 in order to correspond to, or otherwise indicate, the current orientation of a receiving BLE device 302. In one embodiment, receiving device 302 may optionally include sensor/s to allow BLE device 302 to determine its orientation in real time using real time input from these sensor/s. Examples of such sensors include accelerometer and magnetometer sensors which may be provided and configured to operate in similar manner as illustrated and described in relation to transmitting device 304 of FIG. 4B.

Also illustrated in FIG. 3 is the 0° orientation vector of antenna array 197 which indicates the current physical orientation of the antenna array 197, e.g., corresponding to the boresight of antenna array 197. In the illustrated embodiment of FIG. 3, antenna 197 has been positioned relative to BLE device 302 such that its 0° orientation vector corresponds to (is parallel to and aligned with) reference vector ($\vec{n}$) of BLE device 302. However, it will be understood that reference vector ($\vec{n}$) may be different than the physical orientation of antenna array 197, and that antenna array 197 may be oriented freely relative to reference vector ($\vec{n}$) such that the 0° physical orientation vector of antenna array 197 does not correspond to reference vector ($\vec{n}$) of receiving BLE device 302. It will be understood that the illustrated configuration of antenna array 197 of FIG. 3 is exemplary only, and that the number of antenna elements within a given antenna array 197 may be greater or less than four.

It will be understood that the Bluetooth radio packet 400 of FIG. 4A is exemplary only, and that in other embodiments a vector ($\vec{v}$) of an arriving signal may be determined by measuring phase shift or TDOA of received signals including Bluetooth (BLE) radio packets that do not have a constant frequency signal 410 waveform component. Moreover, it will be understood that switching between the individual antenna elements of array 197 may be performed in any manner suitable for determining phase shift or TDOA of a received signal, in this regard, switch 195 may operate to switch through all of antenna elements of array 197 during the duration of the receipt of a single incoming Bluetooth radio packet, and may or may not switch the individual antenna elements so as to allow each antenna to receive the incoming signal for a duration of time that is equal to the receive duration of the other antenna elements.

Still referring to FIG. 3, components of BLE controller 230 (e.g., such as baseband 234) may be configured to determine the arriving signal vector ($\vec{v}$) by measuring the received signal phase shift at array 197, and to then compute the AoA ($\alpha$) from the difference between the received signal vector ($\vec{v}$) and the reference vector ($\vec{n}$) as shown. The computed AoA ($\alpha$) may then be provided from BLE controller 230 to SM 226 of host layer 220 as shown in FIG. 3. Also shown in FIG. 3 is maximum allowable AoA ($\beta$) relative to reference vector ($\vec{n}$) that may be predefined for receiving device 302, and that is used to create a predefined range 375 of allowable AoA values that is centered about reference vector ($\vec{n}$) and that extends outward from all sides of reference vector ($\vec{n}$) by the absolute value of the maximum allowable AoA ($\beta$) as shown. This creates a "cone" 395 of allowable AoA values in three-dimensional space having an aperture of 2$\beta$ that is centered about reference vector ($\vec{n}$), and within which initial authentication is to be allowed. For example, where the value of the maximum allowable AoA ($\beta$) is equal to 30°, then the resulting predefined range 375 of allowable AoA values is a cone centered about reference vector ($\vec{n}$) and having an aperture of 60°.

In one embodiment, value of maximum allowable AoA ($\beta$) may be stored in non-volatile memory of smart module 200 where it may be later retrieved or otherwise accessed by components of BLE controller 230. In this regard, maximum allowable AoA ($\beta$) may be predefined, for example, during initial device fabrication and/or may be later defined by a user via wired or wireless programming. It will be understood that a predefined range of allowable AoA values may be established in other ways, e.g., such as a stored lookup table of specific allowable AoA values defined relative to a reference vector ($\vec{n}$), one or more stored specific ranges of allowable AoA values defined relative to reference vector ($\vec{n}$) that may or may not be centered about reference vector ($\vec{n}$), etc.

Value of maximum allowable AoA ($\beta$) may be based, for example, on the characteristics of a given BLE device application. For example, where a receiving slave BLE device 302 is coupled to control illumination levels of a BLE overhead light fixture, a value of maximum allowable AoA ($\beta$) may be set to only allow initial authentication of a given transmitting master device 304 that is positioned directly beneath the light fixture so as to ensure that the transmitting master device 304 is only allowed to control a BLE light fixture that is immediately above the position of the transmitting master device 304 during authentication, i.e., and is not authenticated to control any other BLE-enabled light fixture that is not overhead but that may happen to be in BLE communication range of the transmitting device 304 at the same time. In this way, unintended or unauthorized connection and control of a BLE-enabled light fixture by a transmitting device 304 that is not directly beneath the light fixture at time of authentication may be prevented. Other examples of slave BLE device applications with which the disclosed systems and methods may be employed include, but are not limited to, BLE-enabled lighting elements within a display case, BLE-enabled cooling unit within a refrigerator, a BLE-enabled automated teller machine (ATM) that allows mobile phone access and authentication only from specified angle/s in front of the ATM, a BLE-enabled door lock that allows authentication for opening and/or unlocking only by a user that is positioned at a certain side (or defined angle/s) relative to the door lock, a BLE-enabled vending machine that allows authenticated mobile purchasing only from specified angle/s in front of the vending machine, etc.

Figure 4B:
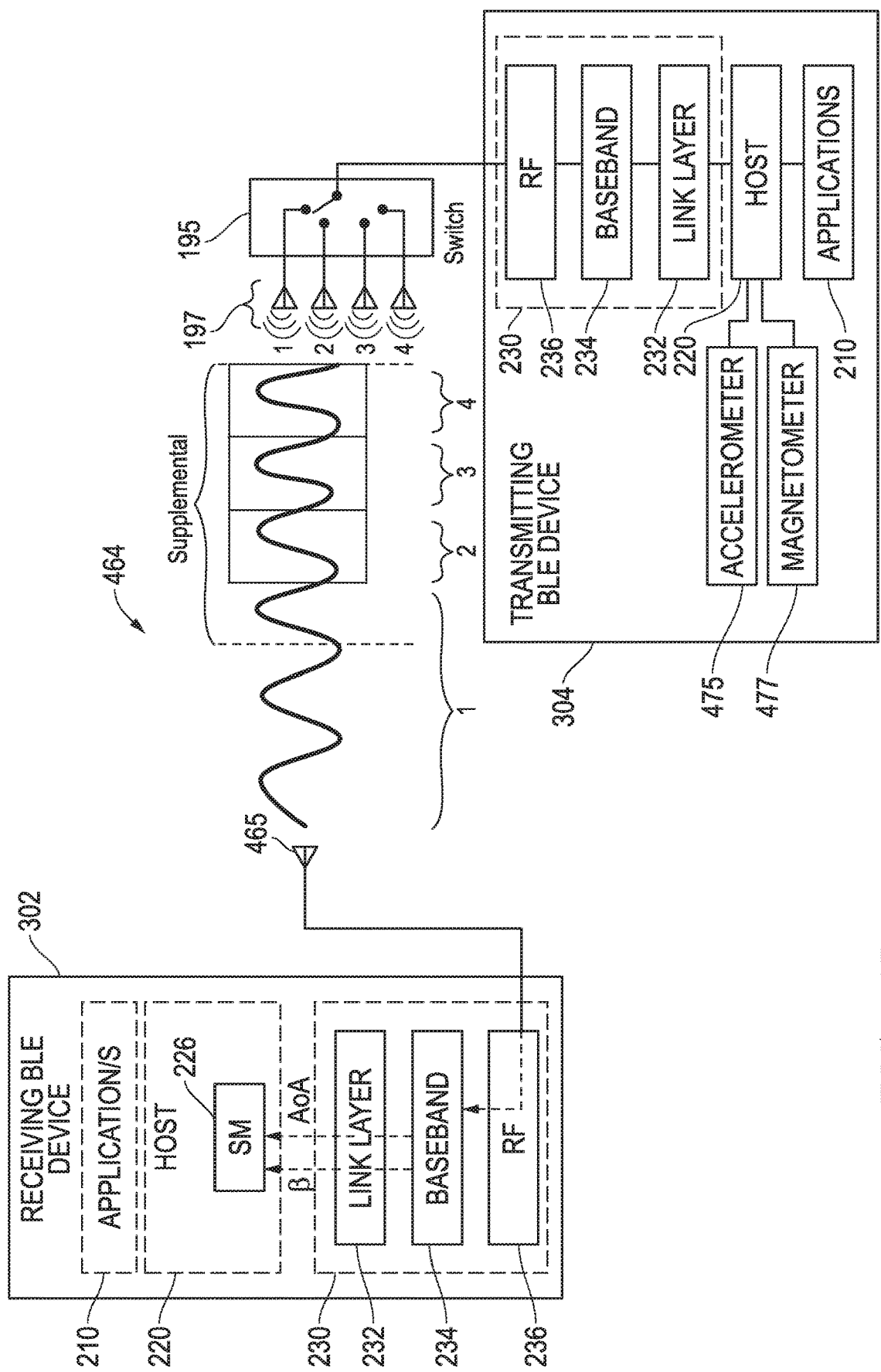
FIG. 4B illustrates a BLE device that is receiving a BLE signal transmitted from another BLE device according to one exemplary embodiment of the disclosed systems and methods.

FIG. 4B illustrates an alternate embodiment in which a receiving BLE device 302 may be configured to determine AoA of a RF signal 464 received from transmitting BLE device 304 based on a determined angle of departure (AoD) of the received signal 464 from transmitting BLE device 304. As shown in FIG. 4B, receiving BLE device 302 of this embodiment may include at least one antenna element 465 that receives a RF signal 464 that is transmitted from multiple antenna elements of at least one switched antenna array 197 of BLE device 304 using a given switching pattern or sequence implemented by array switch 195. In this regard, transmitting BLE device 304 may transmit RF signal 464 while at the same time using switch 195 to select between different antenna elements 1, 2, 3 and 4 of array 197 to transmit the signal 464 one element at a time. At least a portion of RF signal 464 (e.g., at the end of a BLE packet or any other part of the signal) may be transmitted with a constant frequency and using each of the multiple antenna elements 1, 2, 3 and 4 to transmit one at a time during the constant frequency portion of the signal. This results in a phase shift of RF signal 464 as it is received from the different elements at the antenna element 465 of receiving BLE device 302, and from which AoD may be determined by receiving device 302.

Still referring to FIG. 4B, RF signal 464 may be transmitted from transmitting BLE device 304 and may include one or more packets that contain information such as transmitting device antenna configuration (e.g., antenna element spacing) of transmit antenna array 197, antenna array switching information used to transmit signal 464 (e.g., switching pattern or sequence of elements 1, 2, 3 and 4 used by switch 195 during transmission), orientation of transmitting BLE device 304 and its antenna array 197 while transmitting RF signal 464, etc. In this regard, transmitting BLE device 304 may also include one or more sensors to allow BLE device 302 to determine its orientation relative to gravity and magnetic North in real time while transmitting signal 464. Examples of such sensors include accelerometer sensor 475 that may be used to determine the orientation of device 304 relative to gravity (e.g., up versus down or elevation angle), and magnetometer 477 that may be used to determine the orientation of device 304 relative to magnetic North (e.g., compass bearing or azimuth).

Still referring to FIG. 4B, receiving BLE device 302 may measure phase and/or amplitude of the received signal 464, and may determine the above-mentioned transmit antenna array configuration information included in packet/s of RF signal 464, e.g., transmit array switching information, transmitting device/array orientation, etc. AoD from transmitting device 304 may then be calculated based on the measured phase shift of received RF signal 464 that occurs during transmission from each given antenna element 1, 2, 3 and 4, e.g., using similar algorithm as used to determine AoA in FIG. 4A. Receiving device 302 may then calculate the received signal vector ($\vec{v}$) similar (see FIG. 4A) based on the calculated AoD of transmitted RF signal 464 as it is transmitted from the known orientation of transmitting device 304 that is provided in the information of the signal 464 transmitted to receiving device 302. Once received signal vector ($\vec{v}$) is known, then AoA ($\alpha$) of received signal 464 may be determined from the difference between the received signal vector ($\vec{v}$) and the reference vector ($\vec{n}$) using the same methodology or algorithm as described in relation to FIG. 4A.

Figure 5:
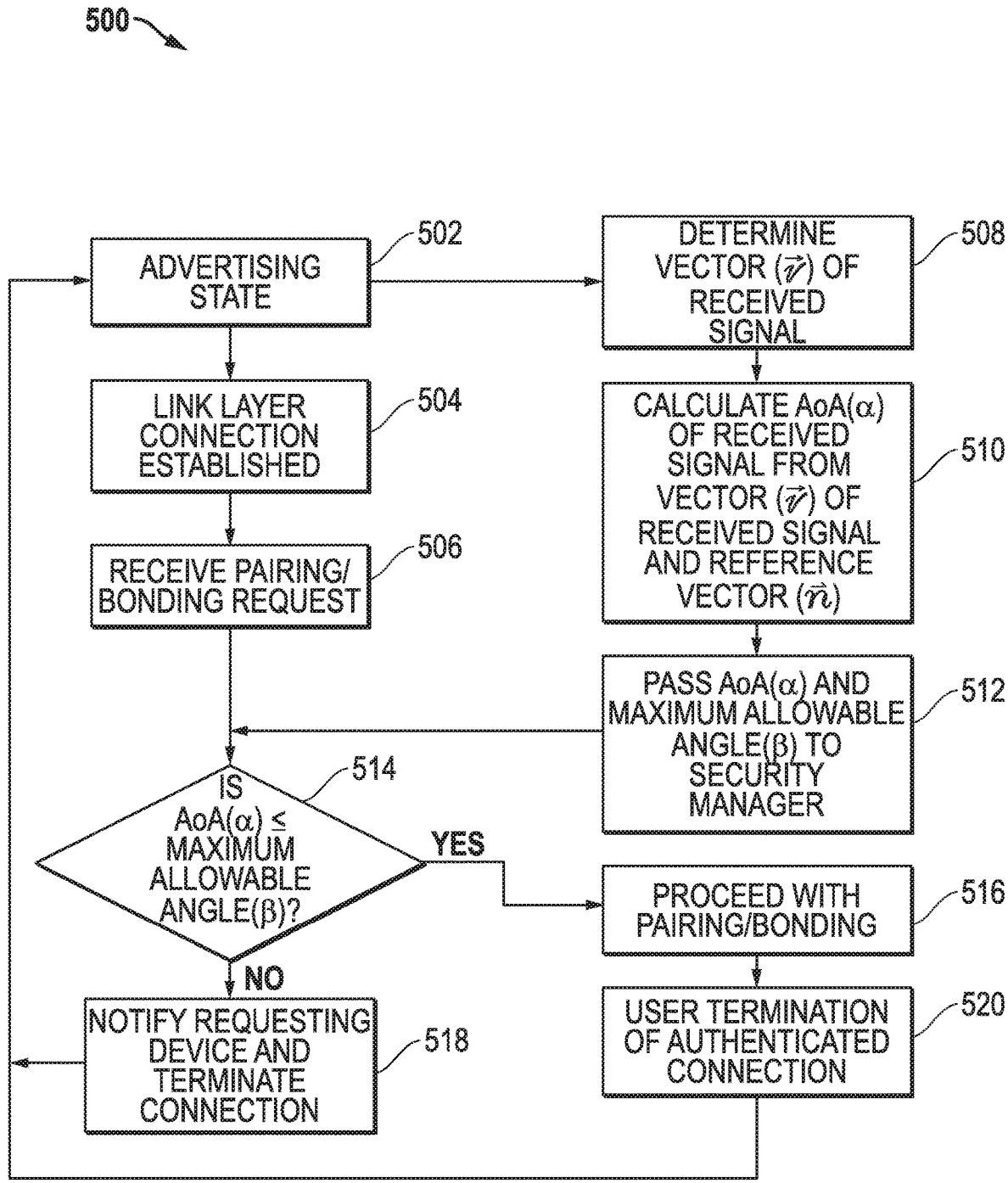
FIG. 5 illustrates an initial authentication process according to one exemplary embodiment of the disclosed systems and methods.
Figure 6A:
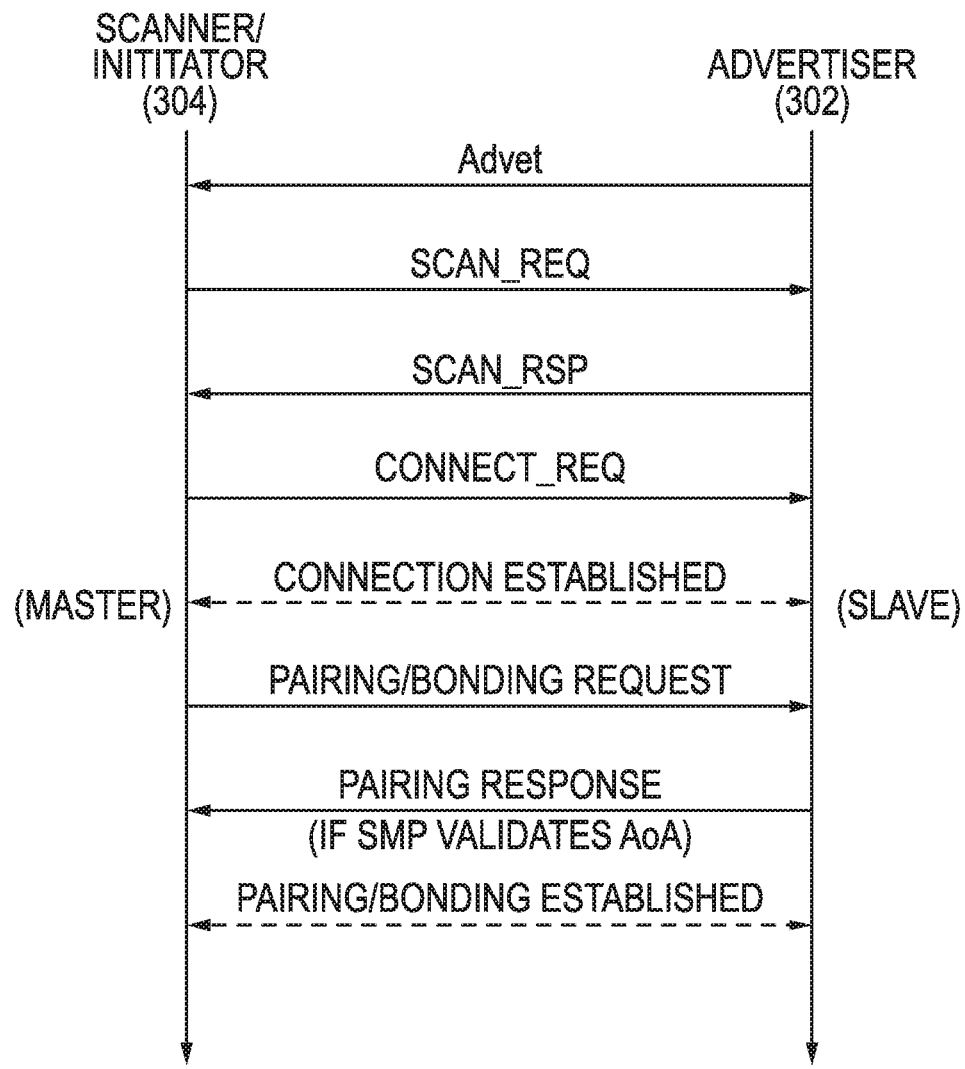
FIG. 6A is a simplified illustration of BLE packet exchange between BLE devices according to one exemplary embodiment of the disclosed systems and methods.
Figure 6B:
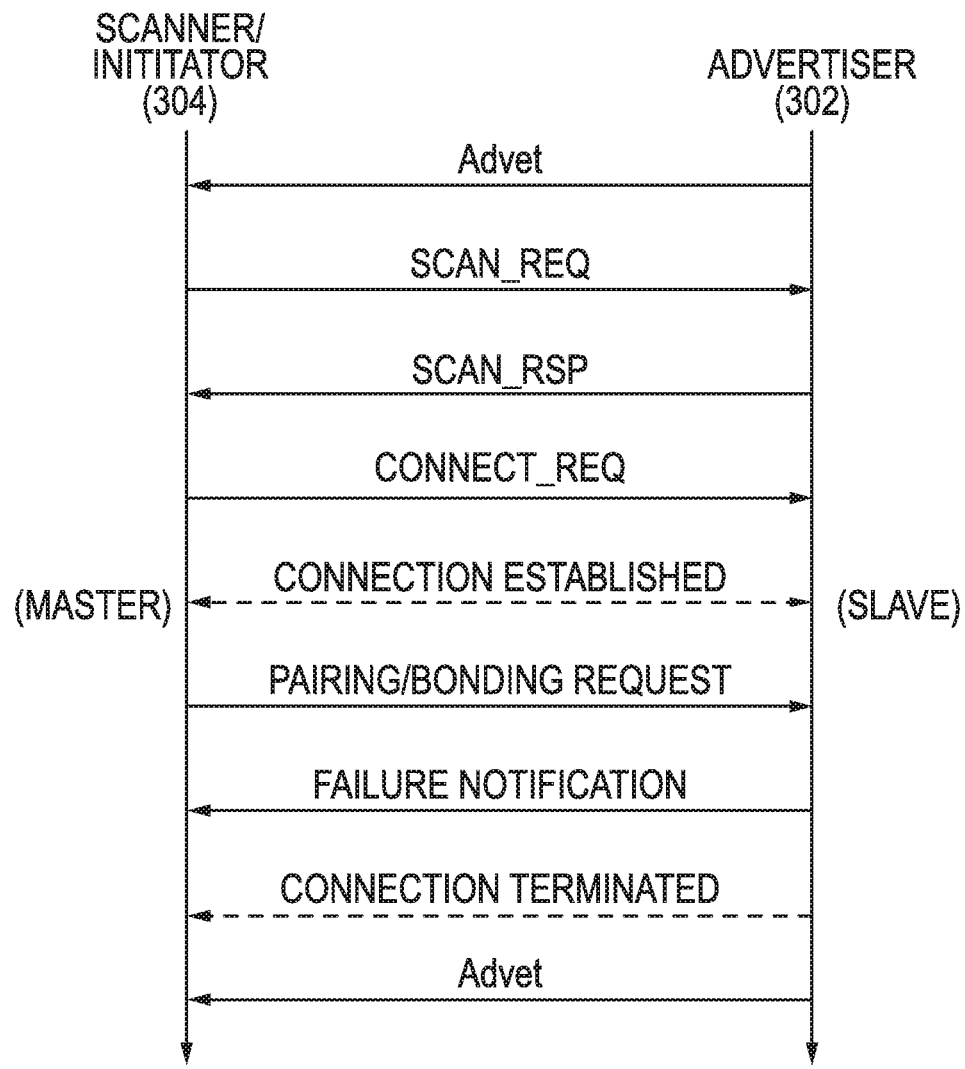
FIG. 6B is a simplified illustration of BLE packet exchange between BLE devices according to one exemplary embodiment of the disclosed systems and methods.

FIG. 5 illustrates initial authentication process 500 as it may be implemented according to one exemplary embodiment of the disclosed systems and methods. FIGS. 6A and 6B are simplified illustrations of BLE packet exchanges between devices 302 and 304 as it may occur during this process under different circumstances. Following is a description of BLE communications features such as may be employed in one embodiment with advertising, connection and pairing/bonding states of FIGS. 5 and 6A-6B.

Example advertisement packet types that may be transmitted from an advertiser device include:

| | |
|---|---|
| ADV_IND | connectable and scannable undirected advertising event |
| ADV_DIRECT_IND | connectable directed advertising event |
| ADV_NONCONN_IND | non-connectable or non-scannable undirected advertising event |
| ADV_SCAN_IND | scannable undirected (non-connectable) advertising event. |

Example types of response packets that may be transmitted by a scanning device in response to received advertisement packets of the advertising device include:

| | |
|---|---|
| SCAN_REQ | scan request for further information from advertiser |
| CONNECT_REQ | connect request. |

If the advertiser device sends either the ADV_IND or ADV_DIRECT_IND packets, a scanner desiring to exchange data with the advertiser may send a CONNECT_REQ packet. If the advertiser accepts the CONNECT_REQ packet, the devices become connected and the communication may be started. At this point, the advertiser becomes a slave and the scanner becomes a master. After connected, the master device may request bonding with the slave device. This means that the devices exchange long term keys or other encryption info to be stored for future connections. In another case, the connection may be encrypted only for the duration of the connection by pairing, during which short term keys are exchanged between the master device and slave device. Pairing with short term key exchange is normally required to occur before bonding between the devices may occur the first time. Exchange of long term keys or other encryption information for bonding may then occur during the paired connection. Once a master device and slave device have exchanged long term keys or other encryption info, a master device may request bonding directly with the slave device without requiring pairing first.

Instead of the CONNECT_REQ, the scanner device may also respond with SCAN_REQ, which is a request for further information from the advertiser. This may be sent as a response to ADV_IND or ADV_SCAN_IND advertising packets.

When an advertising receives a SCAN_REQ packet from a scanning device, the advertising device may give more information to the scanning device by transmitting a scan response (SCAN_RSP) packet. A SCAN_RSP packet may contain information on the name of the advertising device and on the services the advertising device is able to provide. However, SCAN_RSP packet is not limited to carry only this information but may contain other data as well or instead.

As said, a scanning device wishing to connect with the advertising device may send a CONNECT_REQ packet that contains data on one or more of the following: transmit window size defining timing window for first data packet, transmit window offset that is off when the transmit window starts, connection interval which is the time between connection events, slave latency defines number of times the slave may ignore connection events from the master, connection timeout is maximum time between two correctly received packets in the connection before link is considered to be lost, hop sequence is a random number appointing the starting point for a hop, channel map, CRC (Cyclic Redundancy Check) initialization value. The CONNECT_REQ packet initiates the connection, i.e., creates a point-to-point connection between the devices. After a connection is established between two devices, service and/or service characteristic discovery may occur (with or without pairing or bonding first taking place) during which a first one of the connected devices may send a request to the second connected device asking for a list of services and/or service characteristics that are available from the second device. For example, the second device may respond to this request by providing GATT data to the first device that includes a list of the available BLE services from the second device and/or BLE service characteristics (e.g., configuration data or user data for a service) of the second device. The GATT data may include a list of service universally unique identifiers (UUIDs) and/or service characteristic UUIDs.

The state for passing advertising packets is called "advertising state" and the state for connection is called "connected state". In both states, data transfer occurs. A slave device may be a sensor, actuator or other device, such as a temperature sensor, heart rate sensor, lighting device, proximity sensor, etc. A master device may be any electronic device capable of collecting data, e.g., mobile phone, smart phone, personal digital assistant, personal computer, laptop computer, tablet computer, etc.

Packets sent from a slave device in advertising mode may contain approximately 28 bytes of data and a slave address. Packets from a master device in advertisement channel may contain scanner and advertiser addresses. According to an embodiment, the packets from a master device in advertisement channel contains only a master address. Further information on BLE operations and communications may be found, for example, in United States Patent Application Publication No. 2014/0321321; United States Patent Application Publication No. 2015/0319600; and United States Patent Application Publication No. 2015/0271628, each of which is incorporated herein by reference in its entirety for all purposes.

Now, with reference to the exemplary device embodiments of FIG. 3, methodology 500 of FIG. 5 begins in step 502 with receiving device 302 in advertising state. At this time, receiving device 302 may be operating as an advertiser device, and transmitting device 302 may be operating as a scanner device as shown by packet exchanges illustrated in FIGS. 6A and 6B. After exchanging packets in advertisement state, an unauthenticated connection may be established in step 504 between link layers of receiving device 302 and transmitting device 304, which are now connected as slave and master respectively. Then, in step 506 transmitting device 304 may request pairing or bonding with receiving device 302, as may be appropriate. As previously described, pairing may be required first where no previous exchange of long term bonding information (e.g., long term keys) has occurred between devices 302 and 304. Bonding may be requested without pairing where devices 302 and 304 have previously exchanged such long term bonding information.

Still referring to FIG. 5, before, after or simultaneous with receiving a pairing/bonding request in step 506, the arriving signal vector ($\vec{v}$) of signal/s received from receiving device 302 may be determined by BLE controller 230 of receiving device 302 in step 508, e.g., by measuring the received signal phase shift or TDOA at elements of antenna array 197. Then, in step 510, BLE controller 230 of receiving device 302 may compute the received signal AoA (α) based on the difference between the received signal vector ($\vec{v}$) and the reference vector ($\vec{n}$), e.g., such as solving for received signal AoA (α) using the below relationship or other suitable technique such as calculating the respective angles of vectors $\vec{v}$ and $\vec{n}$ and subtracting the difference.

$$\cos \alpha = \frac{\vec{v} \cdot \vec{n}}{|\vec{v}| \cdot |\vec{n}|}$$

In step 512, BLE controller 230 may pass the determined received signal AoA (α) and the predefined maximum allowable angle (β) to SM 226 in host layer 220 for use in an initial authentication process of step 514 to be performed in security manager protocol (SMP) prior to allowing pairing or bonding to proceed. During this initial authentication process performed in security manager protocol (SMP), the determined AoA (α) of the arriving signal 307 is compared to maximum allowable angle (β). If the determined value of received signal AoA (α) is found to be less than or equal to the predefined value of maximum allowable AoA (β), then the connection between receiving device 302 and transmitting device 304 is considered authenticated for pairing or bonding and methodology 500 proceeds to step 516 (e.g., see also FIG. 6A). At this time, receiving device 302 and transmitting device 304 remain paired or bonded as long as they are in BLE wireless communication range of each other (e.g., even if transmitting device 304 is moved to transmit it signal outside the maximum allowable angle (β) of receiving device 302), or until a user terminates the authenticated connection as shown in step 520, at which time methodology 500 returns to step 502 and repeats as shown (e.g., allowing the user to reposition the transmitting master device 304 for authenticated connection to another receiving slave device 302). Services, commands, configuration data, etc. may be exchanged between receiving device 302 and transmitting device 304 while receiving device 302 and transmitting device 304 remain so paired or bonded, Returning to step 514, if the determined value of received signal AoA (α) is found to be greater than the predefined value of maximum allowable AoA (β), then receiving device 302 denies the initial authentication and transmitting device 304 is notified of authentication failure by receiving device 302 and the connection is terminated in step 518 (e.g., see also FIG. 6B). At this time, methodology 500 may return to step 502 and repeat as shown.

Although methodology 500 of FIG. 5 has been described in relation to the exemplary embodiment of FIG. 3, it will be understood that methodology 500 may be implemented with other wireless device hardware and software configurations. It will also be understood that methodology 500 of FIG. 5 is exemplary only, and that any other combination of additional, fewer, and/or alternative steps may be employed that is suitable for controlling authentication of a BLE connection between first and second BLE wireless devices based on an angle of arrival (AoA) of an arriving RF signal received at the first BLE wireless device from the second BLE wireless device.

In one embodiment, authentication for pairing or bonding between receiving device 302 and transmitting device 304 (such as performed in methodology 500) may not require any password to be entered by a user into transmitting device 304. In another embodiment, an AoA authentication process (such as performed in the steps of methodology 500) may be repeated multiple times by the same receiving device 302 to authenticate and allow authenticated connections to multiple different transmitting devices 304 and their respective users as long as the determined value of received signal AoA (α)

from any given transmitting device 304 is found to be less than or equal to the predefined value of maximum allowable AoA (β) for the receiving device 302.

Figure 7:
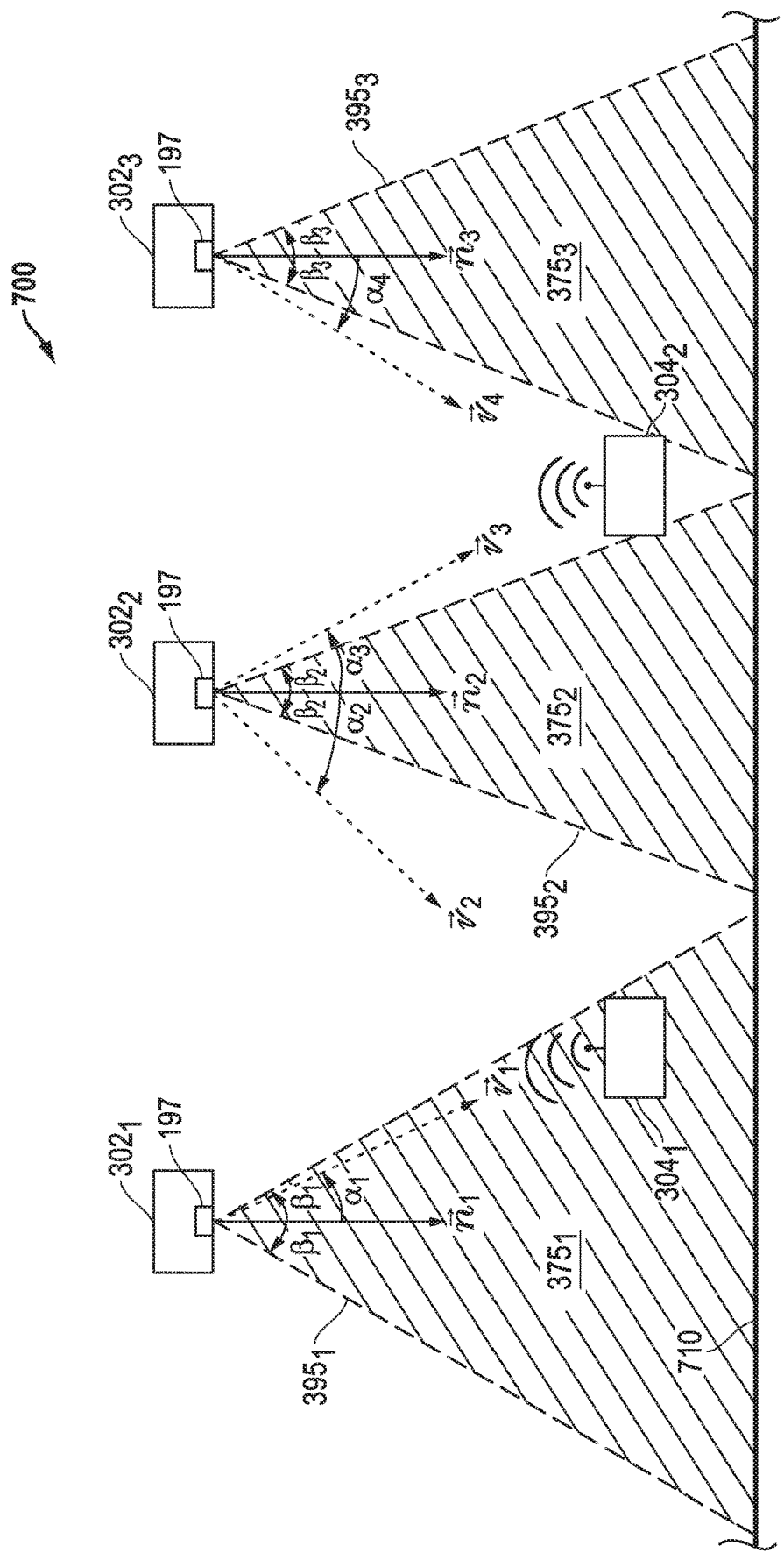
FIG. 7 illustrates a BLE wireless communication environment according to one exemplary embodiment of the disclosed systems and methods.

FIG. 7 illustrates one exemplary embodiment of a BLE wireless communication environment 700 where three different fixed BLE slave receiving devices $302_1$ to $302_3$ are operating within BLE wireless range of the same two mobile BLE master transmitting devices $304_1$ and $304_2$. Each of fixed BLE advertiser/slave receiving devices 302 may be, for example, different spaced-apart overhead light fixtures that are mounted to the ceiling of the same room. In other non-limiting examples, each of each of BLE advertiser/slave receiving devices 302 may be a lighting element in a different spaced-apart display case within the same showroom, or may be a cooling unit in a different spaced-apart refrigerator within a grocery store. In yet other embodiments, each of BLE advertiser/slave receiving devices $302_1$ to $302_3$ may be a different type of BLE enabled device from the other BLE advertiser/slave receiving devices 302. In any case, each of BLE advertiser/slave receiving devices $302_1$ to $302_3$ may be configured in one embodiment with a switched antenna array 197 and BLE module components such as described herein in relation to FIGS. 1-3.

In the illustrated embodiment of FIG. 7, the antenna array 197 of each receiving slave device 302 has a 0° orientation indicated by reference vector $\vec{n}$, and a predefined maximum allowable AoA (β) that defines a cone 395 of allowable AoA values about its corresponding reference vector $\vec{n}$ in a manner as previously described herein. As shown, in this embodiment the receiving devices $302_1$ to $302_2$ have been set up or positioned within environment 700 such that the cones $395_1$ to $395_3$ are non-overlapping with each other. This may be done, for example, by physical placement of the receiving devices 302, adjustment of antenna arrays 197 of the receiving devices 302, and/or by user programming of each receiving device 302 with an appropriate maximum allowable AoA (β) to achieve the non-overlapping configuration. In the illustrated embodiment a surface or other barrier 710 may be present (e.g., such as a floor of a building in a case where slave devices 302 are downward-pointing BLE-enabled overhead light fixtures, or a wall in in a case where slave devices 302 are sideways-pointing BLE-enabled refrigerator units, etc.). However, in other embodiments no such barrier may present, e.g., such as when slave devices 302 are sideways-pointing in an environment that is outside any building.

In another embodiment, maximum allowable AoA (β) of two or more separate slave devices 302 may be selected or otherwise set to define two or more defined cones 395 that are overlapping, e.g., such as in the case where physical access of a master device 304 to a given space (e.g., such as inside a house, inside a given room, inside a given office, etc.) is required to allow the master device 304 to be authenticated for access to multiple slave devices 302 positioned anywhere within that space. In a further embodiment, a master device 404 may be optionally provided with a guarantee that it is connected (i.e., paired or bonded) to the correct slave device 302 or slave devices 302, e.g., using another method such as a blinking a light displayed on the connected slave device/s 302.

Still referring to FIG. 7, transmitting master device $304_1$ has been positioned by a human user to transmit a RF signal having an incoming vector $\vec{v}_1$ to receiving slave device $302_1$ corresponding to an AoA of $\alpha_1$ that is less than the maximum allowable AoA ($\beta_1$) for receiving slave device $302_1$. Thus, receiving slave device $302_1$ will allow initial authentication for pairing or bonding with transmitting master device $304_1$ for control of receiving slave device $302_1$. However, transmitting master device $304_1$ is at the same time positioned to transmit its RF signal with an incoming vector $\vec{v}_2$ to receiving slave device $302_2$ corresponding to an AoA of $\alpha_2$ which is greater than the maximum allowable AoA ($\beta_2$) for receiving slave device $302_2$. Thus, in this case receiving slave device $302_2$ will not allow initial authentication for pairing or bonding with transmitting master device $304_1$ for control of receiving slave device $302_2$. In this way, by positioning transmitting master device $304_1$ in front of receiving slave device $302_1$, a user of transmitting master device $304_1$ may be assured that transmitting master device $304_1$ will only be authenticated and paired/bonded with receiving slave device $302_1$ even though transmitting master device $304_1$ is at the same time in BLE wireless communication range with receiving slave devices $302_2$ and $302_3$. After this initial authentication between receiving slave device $302_1$ and transmitting master device $304_1$, transmitting master device $304_1$ may be moved or repositioning anywhere within BLE wireless communication range of receiving slave device $302_1$ (even outside the maximum allowable AoA $\beta_1$) while maintaining its authenticated connection with receiving slave device $302_1$, e.g., until the user initiates termination of the authenticated connection to allow connection to another receiving slave device $302_2$ or $302_3$.

FIG. 7 also illustrates mobile transmitting master device $304_2$ that is currently positioned to transmit an RF signal having an incoming vector $\vec{v}_3$ to receiving slave device $302_2$ and having an incoming vector $\vec{v}_1$ to receiving slave device $302_3$. In this case, incoming vector $\vec{v}_3$ corresponds to an AoA of $\alpha_3$ that is greater than the maximum allowable AoA ($\beta_2$) for receiving slave device $302_2$, and incoming vector $\vec{v}_4$ corresponds to an AoA of $\alpha_4$ that is greater than the maximum allowable AoA ($\beta_3$) for receiving slave device $302_3$. Transmitting master device $304_2$ is also positioned to transmit a RF signal having an incoming AoA at receiving slave device $302_1$ that lies outside the maximum allowable AoA ($\beta_1$) for receiving slave device $302_1$. Thus, none of receiving slave devices $302_1$ to $302_3$ will allow initial authentication for pairing or bonding with transmitting master device $304_2$, e.g., until transmitting master device $304_2$ is repositioned by a user to transmit an RF signal having an AoA that is within the cone 395 of allowable AoA values for one of the receiving slave devices 302.

Although certain exemplary embodiments have been described in which a receiving slave device is configured to perform initial authentication of a transmitting master device based on incoming AoA (α) of the transmitted signal from the transmitting master device, it will be understood that the roles may be reversed, e.g., a receiving master device may be configured to perform initial authentication of a transmitting slave device based on incoming AoA (α) of the transmitted signal from the transmitting slave device. Moreover, it is also possible that dual authentication based on AoA is also possible between a master device and slave device, e.g., each of the slave device and the master device may be configured to perform initial authentication of the corresponding master device and slave device based on incoming AoA of the transmitted signal from the corresponding slave device and master device. In this latter example, initial authentication will only be allowed between the devices in the case where the AoA (α) of the exchanged BLE signals received at each of the master and slave devices lies within the respective allowable AoA (β) value for each of the master and slave devices.

It will also be understood that one or more of the tasks, functions, or methodologies described herein for a radio module or wireless device (e.g., including those described herein for components of application layer 210, host layer 220 and BLE controller 230 of FIG. 2; module segment 110 including CPU 150, module segment 120 including link layer engine and baseband components of FIG. 1, etc.) may be implemented using one or more programmable integrated circuits (e.g., central processing units (CPUs), processors, controllers, microcontrollers, microprocessors, hardware accelerators, FPGAs (field programmable gate arrays), ASICs (application specific integrated circuits), and/or other programmable integrated circuits) that are programmed to perform the operations, tasks, functions, or actions described herein for the disclosed embodiments. For example, the one or more programmable integrated circuits can be configured to execute or otherwise be programmed with software, firmware, logic, and/or other program instructions stored in one or more non-transitory tangible computer-readable mediums (e.g., example, data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For example, one or more of the tasks, functions, or methodologies described herein may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a programmable integrated circuit such as CPU, controller, microcontroller, microprocessor, ASIC, etc. or executed on a programmable logic device "PLD" such as FPGA, complex programmable logic device "CPLD", etc.) to perform one or more steps of the methodologies disclosed herein. In one embodiment, a group of such processors and PLDs may be programmable integrated circuits selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodology disclosed herein. It will also be understood that one or more steps of the present methodologies may be employed in one or more code segments of the computer program. For example, a code segment executed by the information handling system may include one or more steps of the disclosed methodologies.

Further, while the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising:
a first wireless device and a second wireless device, the first wireless device including at least one programmable integrated circuit coupled to radio circuitry and an antenna, and the second wireless device including at least one programmable integrated circuit coupled to radio circuitry and an antenna;
where the at least one programmable integrated circuit of the second wireless device is programmed to transmit a first wireless signal to the first wireless device, and where the at least one programmable integrated circuit of the first wireless device is programmed to transmit a second wireless signal to the second wireless device;
where the at least one programmable integrated circuit of the first wireless device is programmed to determine whether to initially authenticate a wireless connection with the second wireless device based on a comparison between an angle of arrival (AoA) of the first wireless signal received from the second wireless device to a first predefined range of allowable AoA values;
where the at least one programmable integrated circuit of the second wireless device is programmed to determine whether to initially authenticate the wireless connection with the first wireless device based on a comparison between an angle of arrival (AoA) of the second wireless signal received from the first wireless device to a second predefined range of allowable AoA values; and
where the at least one programmable integrated circuit of the first and second wireless devices are programmed to then to establish an authenticated wireless connection between the first and second wireless devices only if:
it is determined by the at least one programmable integrated circuit of the first wireless device to initially authenticate the wireless connection with the second wireless device, and
at the same time it is determined by the at least one programmable integrated circuit of the second wireless device to initially authenticate the wireless connection with the first wireless device.

2. The system of claim 1, where the at least one programmable integrated circuit of the second wireless device is further programmed to transmit the first wireless signal to the first wireless device and the at least one programmable integrated circuit of the first wireless device is further programmed to transmit the second wireless signal to the second wireless device while the first wireless device and second wireless device are communicating across an unauthenticated wireless connection; and
where the at least one programmable integrated circuit of the first wireless device is further programmed to:
determine the AoA of the received first wireless signal relative to a first reference vector defined to extend from a position of the first wireless device and the first wireless signal from the second wireless device, and
compare the determined AoA of the received first wireless signal to the first predefined range of allowable AoA values relative to the first reference vector to determine if the AoA of the received first wireless signal is within the first predefined range of allowable AoA values;

where the at least one programmable integrated circuit of the second wireless device is further programmed to:
  determine the AoA of the received second wireless signal relative to a second reference vector defined to extend from a position of the second wireless device and the second wireless signal from the first wireless device, and
  compare the determined AoA of the received second wireless signal to the second predefined range of allowable AoA values relative to the second reference vector to determine if the AoA of the received second wireless signal is within the second predefined range of allowable AoA values; and
where the at least one programmable integrated circuit of the first and second wireless devices are programmed to establish an authenticated wireless connection between the first and second wireless device only if the AoA of the received first wireless signal at the first device is within the first predefined range of allowable AoA values at the same time that the AoA of the received second wireless signal at the second device is within the second predefined range of allowable AoA values, and to deny an authenticated wireless connection between the first and second wireless devices if either of:
  the AoA of the received first wireless signal at the first wireless device is not within the first predefined range of allowable AoA values, or
  the AoA of the received second wireless signal at the second wireless device is not within the second predefined range of allowable AoA values.

3. The system of claim 1, where the at least one programmable integrated circuit of the first wireless device is further programmed to compare a determined AoA of the received first wireless signal to the first predefined range of allowable AoA values to determine if the AoA of the received first wireless signal is within the first predefined range of allowable AoA values, and where the at least one programmable integrated circuit of the second wireless device is further programmed to compare a determined AoA of the received second wireless signal to the second predefined range of allowable AoA values to determine if the AoA of the received second wireless signal is within the second predefined range of allowable AoA values; and
  where the at least one programmable integrated circuit of the first wireless device and the at least one programmable integrated circuit of the second wireless device are programmed to:
    deny an authenticated wireless connection between the first and second wireless devices if either of the AoA of the received first wireless signal is not within the first predefined range of allowable AoA values or the AoA of the received second wireless signal is not within the second predefined range of allowable AoA values, and
    to notify the first and second wireless device of an authentication failure when the authenticated wireless connection is denied.

4. The system of claim 1, where the at least one programmable integrated circuit of the first wireless device and the at least one programmable integrated circuit of the second wireless device are is further programmed to:
  determine to initially authenticate a wireless connection between the first and second wireless devices and to establish an authenticated wireless connection between the first and second wireless devices only when both the AoA of the first wireless signal received from the second wireless device is determined to be within the first predefined range of allowable AoA values and the AoA of the second wireless signal received from the first wireless device is determined to be within the second predefined range of allowable AoA values; and
  then to maintain the authenticated wireless connection established between the first and second wireless devices even when a position of the second wireless device changes relative to the first wireless device such that a second wireless signal received from the first wireless device across the authenticated wireless connection has an AoA that is not within the first predefined range of allowable AoA values, or such that a second wireless signal received from the first wireless device across the authenticated wireless connection has an AoA that is not within the second predefined range of allowable AoA values.

5. The system of claim 1, where the first and second wireless devices are each a Bluetooth Low Energy (BLE) enabled device; where the at least one programmable integrated circuit of the second wireless device is further programmed to transmit a request for pairing or bonding to the first wireless device while the first wireless device and second wireless device are communicating as slave and master across an unauthenticated wireless connection, and the at least one programmable integrated circuit of the first wireless device is further programmed to accept the pairing or bonding request and establish an authenticated paired or bonded wireless connection between the first and second wireless devices, only if the at least one programmable integrated circuit of the first wireless device determines to initially authenticate the wireless connection with the second wireless device at the same time that the at least one programmable integrated circuit of the second wireless device determines to initially authenticate the wireless connection with the first wireless device.

6. The system of claim 1,
  where the antenna of the first wireless device comprises an antenna array having multiple antenna elements;
  where the at least one programmable integrated circuit of the second wireless device is programmed to transmit a portion of the first wireless signal that is outside a preamble and an address of a packet to the first wireless device as a constant frequency signal; and
  where the at least one programmable integrated circuit of the first wireless device is further programmed to:
    switch between the individual antenna elements of the antenna array of the first wireless device during the duration of receipt of the constant frequency signal so as to provide the received constant frequency signal from one antenna element of the antenna array at time to the radio circuitry of the first wireless device, and
    determine the AoA of the received first wireless signal based on a difference in phase or time of arrival of the constant frequency signal as it is received at the different individual antenna elements of the array of the first wireless device.

7. The system of claim 1, where the antenna of the second wireless device comprises an antenna array having multiple antenna elements; where the at least one programmable integrated circuit of the second wireless device is programmed to transmit at least a portion of the first wireless signal to the first wireless device as a constant frequency signal while switching between the individual antenna elements of the antenna array of the second wireless device one at a time during the duration of transmission of the constant frequency signal; and where the at least one programmable integrated circuit of the first wireless device is further programmed to:

determine a phase shift of the constant frequency signal as it is received from the different antenna elements of the antenna array of the second wireless device at the antenna of the first wireless device; and determine the AoA of the received first wireless signal based on the determined phase shift of the received constant frequency signal.

8. A system, comprising:

a first wireless device and a second wireless device, the first wireless device including at least one programmable integrated circuit coupled to radio circuitry and an antenna, and the second wireless device including at least one programmable integrated circuit coupled to radio circuitry and an antenna;

where the at least one programmable integrated circuit of the second wireless device is programmed to transmit a first wireless signal to the first wireless device; and where the at least one programmable integrated circuit of the first wireless device is programmed to:

determine whether to initially authenticate a wireless connection with the second wireless device based on a comparison between an angle of arrival (AoA) of the first wireless signal received from the second wireless device to a predefined range of allowable AoA values, and then to establish an authenticated wireless connection between the first and second wireless device only if it is determined to initially authenticate the wireless connection with the second wireless device;

where the antenna of the second wireless device comprises an antenna array having multiple antenna elements; where the at least one programmable integrated circuit of the second wireless device is programmed to transmit at least a portion of the first wireless signal to the first wireless device as a constant frequency signal while switching between the individual antenna elements of the antenna array of the second wireless device one at a time during the duration of transmission of the constant frequency signal; and where the at least one programmable integrated circuit of the first wireless device is further programmed to:

determine a phase shift of the constant frequency signal as it is received from the different antenna elements of the antenna array of the second wireless device at the antenna of the first wireless device, and determine the AoA of the received first wireless signal based on the determined phase shift of the received constant frequency signal; and where the at least one programmable circuit of the second wireless device is programmed to include orientation information of the second wireless device within the transmitted first wireless signal; and where the at least one programmable integrated circuit of the first wireless device is programmed to:

determine an angle of departure (AoD) of the first wireless signal from the second wireless device based on the determined phase shift of the received constant frequency signal, determine an orientation of the second wireless device based on the orientation information included within the first wireless signal, and determine the AoA of the received first wireless signal based on the determined orientation of the second wireless device and the determined AoD of the received constant frequency signal; and where the second wireless device further comprises at least one sensor coupled to the programmable integrated circuit of the second wireless device; and where the programmable integrated circuit of the second wireless device is programmed to determine the orientation of the second wireless device relative to gravity and magnetic North based on information from the sensor.

9. A method, comprising:

using at least one programmable integrated circuit of a first wireless device to determine whether to initially authenticate a wireless connection with a second wireless device based on a comparison between an angle of arrival (AoA) of a first wireless signal received from the second wireless device to a predefined range of allowable AoA values; and then to establish an authenticated wireless connection between the first and second wireless device only if it is determined to initially authenticate the wireless connection with the second wireless device;

where the second wireless device comprises an antenna array having multiple antenna elements; and where the method further comprises:

transmitting at least a portion of the first wireless signal from the second wireless device to the first wireless device as a constant frequency signal while switching between the individual antenna elements of the antenna array of the second wireless device one at a time during the duration of transmission of the constant frequency signal, determining a phase shift of the constant frequency signal as it is received from the different antenna elements of the antenna array of the second wireless device at an antenna of the first wireless device, and determining the AoA of the received first wireless signal based on the determined phase shift of the received constant frequency signal; and where the method further comprises:

including orientation information of the second wireless device within the transmitted first wireless signal from the second wireless device, determining an angle of departure (AoD) of the first wireless signal from the second wireless device based on the determined phase shift of the received constant frequency signal, determining an orientation of the second wireless device based on the orientation information included within the first wireless signal, and determining the AoA of the received first wireless signal based on the determined orientation of the second wireless device and the determined AoD of the received constant frequency signal.

10. The method of claim 9, where the second wireless device further comprises at least one sensor coupled to the programmable integrated circuit of the second wireless device; and where the method further comprises determining the orientation of the second wireless device relative to gravity and magnetic North based on information from the sensor.

11. The method of claim 9, further comprising using the least one programmable integrated circuit of the first wireless device to determine whether to initially authenticate the wireless connection with the second wireless device based on the comparison between the angle of arrival (AoA) of the first wireless signal received from the second wireless device to the predefined range of allowable AoA values and without requiring a user of the second wireless device to have physical access to the second wireless device and without using any other user authentication action that includes using a separate wireless channel communication between the first and second wireless devices, and without using RSSI-based filtering or other proximity filter for the second wireless device.

12. The method of claim 9, further comprising:
receiving the first wireless signal from the second wireless device at the first wireless device while the first wireless device and second wireless device are communicating across an unauthenticated wireless connection; and
using the at least one programmable integrated circuit to:
determine the AoA of the received first wireless signal relative to a reference vector defined to extend from a position of the first wireless device,
compare the determined AoA of the received first wireless signal to a predefined range of allowable AoA values relative to the reference vector to determine if the AoA of the received first wireless signal is within the predefined range of allowable AoA values, and
establish an authenticated wireless connection between the first and second wireless device only if the AoA of the received first wireless signal is within the predefined range of allowable AoA values and to deny an authenticated wireless connection between the first and second wireless devices if the AoA of the received first wireless signal is not within the predefined range of allowable AoA values.

13. The method of claim 12, further comprising using at least one sensor to determine a current orientation of the first wireless device in real time; and then defining the reference vector to correspond to the real time determined current orientation of the first wireless device.

14. The method of claim 9, where the predefined range of allowable AoA values is defined by a predefined value of maximum allowable AoA relative to a reference vector defined to extend from a position of the first wireless device; and where the method further comprises:
receiving the first wireless signal from the second wireless device at the first wireless device while the first wireless device and second wireless devices are communicating across an unauthenticated wireless connection; and
using the at least one programmable integrated circuit to:
determine the AoA of the received first wireless signal relative to the reference vector defined to extend from the position of the first wireless device,
compare the determined AoA of the received first wireless signal to the predefined value of maximum allowable AoA to determine if the AoA of the received first wireless signal is less than or equal to the predefined value of maximum allowable AoA, and
establish an authenticated wireless connection between the first and second wireless devices only if the AoA of the received first wireless signal is less than or equal to the predefined value of maximum allowable AoA and to deny an authenticated wireless connection between the first and second wireless device if the AoA of the received first wireless signal is greater than the predefined value of maximum allowable AoA.

15. The method of claim 9, further comprising using the at least one programmable integrated circuit of the first wireless device to:
compare a determined AoA of the received first wireless signal to the predefined range of allowable AoA values to determine if the AoA of the received first wireless signal is within the predefined range of allowable AoA values;
to deny an authenticated wireless connection between the first and second wireless devices if the AoA of the received first wireless signal is not within the predefined range of allowable AoA values; and
to notify the second wireless device of an authentication failure when the authenticated wireless connection is denied.

16. The method of claim 9, further comprising using the at least one programmable integrated circuit of the first wireless device to determine to initially authenticate a wireless connection with the second wireless device and to establish an authenticated wireless connection between the first and second wireless devices only when the AoA of the first wireless signal received from the second wireless device is determined to be within the predefined range of allowable AoA values; and then to maintain the authenticated wireless connection established between the first and second wireless devices even when a position of the second wireless device changes relative to the first wireless device such that a second wireless signal received from the second wireless device across the authenticated wireless connection has an AoA that is not within the predefined range of allowable AoA values.

17. The method of claim 9, where the method further comprises using the at least one programmable integrated circuit to:
implement a host layer coupled to a baseband processor by a link layer on first wireless device;
use the baseband processor to determine the AoA of the first wireless signal received from the second wireless device;
pass the determined AoA of the first wireless signal from the baseband processor to the host layer; and
use the host layer to compare the AoA of the first wireless signal received from the second wireless device to the predefined range of allowable AoA values, and then to determine whether to initially authenticate the wireless connection with the second wireless device based on the comparison between the AoA of the first wireless signal to the predefined range of allowable AoA values.

18. The method of claim 9, where the first and second wireless devices are each a Bluetooth Low Energy (BLE) enabled device; and where the method further comprises:
receiving the first wireless signal from the second wireless device at the first wireless device while the first wireless device and second wireless device are communicating across an unauthenticated wireless connection;
receiving a request for pairing or bonding from the second wireless device while the first wireless device and second wireless device are communicating as slave and master across an unauthenticated wireless connection, the request for pairing or bonding being the same or different than the first wireless signal received from the second wireless device; and
using the at least one programmable integrated circuit to:
determine the AoA of the received first wireless signal relative to a reference vector defined to extend from a position of the first wireless device, compare the determined AoA of the received first wireless signal to a predefined range of allowable AoA values relative to the reference vector to determine if the AoA of the received first wireless signal is within the predefined range of allowable AoA values, and accept the pairing or bonding request and establish an authenticated paired or bonded wireless connection between the first and second wireless devices only if the AoA of the received first wireless signal is within the predefined range of allowable AoA values and deny the pairing or bonding request and not establish an authenticated wireless connection between the first and second wireless devices if the AoA of the received first wireless signal is not within the predefined range of allowable AoA values.

19. The method of claim 18, further comprising using the at least one programmable integrated circuit to accept the pairing or bonding request by exchanging short term keys and/or long term keys with the second wireless device to establish an authenticated paired or bonded wireless connection between the first and second wireless devices only if the AoA of the received first wireless signal is within the predefined range of allowable AoA values and deny the pairing or bonding request and not exchanging short term keys and/or long term keys with the second wireless device to establish an authenticated wireless connection between the first and second wireless devices if the AoA of the received first wireless signal is not within the predefined range of allowable AoA values.

20. The method of claim 9, further comprising operating the first wireless device in a common wireless communication environment with the second wireless device and a third wireless device; using the at least one programmable integrated circuit of the first wireless device to determine to initially authenticate a wireless connection with the third wireless device based on a comparison between an angle of arrival (AoA) of a second wireless signal received from the third wireless device to the predefined range of allowable AoA values; and then to establish an authenticated wireless connection between the first and third wireless device only if it is determined to initially authenticate the wireless connection with the third wireless device.

21. The method of claim 9, further comprising using the least one programmable integrated circuit of the first wireless device to determine whether to initially authenticate the wireless connection with the second wireless device based only on the comparison between the angle of arrival (AoA) of the first wireless signal received from the second wireless device to the predefined range of allowable AoA values.

22. The method of claim 9, where the second wireless device comprises an antenna array having multiple antenna elements; and where the method further comprises:

transmitting at least a portion of the first wireless signal from the second wireless device to the first wireless device as a constant frequency signal while switching between the individual antenna elements of the antenna array of the second wireless device one at a time during the duration of transmission of the constant frequency signal;

determining a phase shift of the constant frequency signal as it is received from the different antenna elements of the antenna array of the second wireless device at the antenna of the first wireless device; and determining the AoA of the received first wireless signal based on the determined phase shift of the received constant frequency signal.

23. A method, comprising using at least one programmable integrated circuit of a first wireless device to determine whether to initially authenticate a wireless connection with a second wireless device based on a comparison between an angle of arrival (AoA) of a first wireless signal received from the second wireless device to a predefined range of allowable AoA values; and then to establish an authenticated wireless connection between the first and second wireless device only if it is determined to initially authenticate the wireless connection with the second wireless device; and where the method further comprises:

receiving the first wireless signal from the second wireless device at the first wireless device while the first wireless device and second wireless device are communicating across an unauthenticated wireless connection; and using the at least one programmable integrated circuit to:
determine the AoA of the received first wireless signal relative to a reference vector defined to extend from a position of the first wireless device, compare the determined AoA of the received first wireless signal to the predefined range of allowable AoA values that define a cone of allowable values for the first wireless device centered about and extending outward from all sides of the reference vector to determine if the AoA of the received first wireless signal is within the cone of allowable AoA values for the first wireless device, and establish an authenticated wireless connection between the first and second wireless device only if the AoA of the received first wireless signal is within the predefined cone of allowable AoA values for the first wireless device and to deny an authenticated wireless connection between the first and second wireless devices if the AoA of the received first wireless signal is not within the cone of allowable AoA values for the first wireless device;

where a cone of allowable values is centered about and extending outward from all sides of a reference vector that extends from a position of a third wireless device; and where the method further comprises:
receiving the first wireless signal from the second wireless device at the third wireless device, and while the third wireless device and second wireless device are communicating across an unauthenticated wireless connection; and using at least one programmable integrated circuit of the third wireless device to:
determine the AoA of the received first wireless signal relative to the reference vector defined to extend from the position of the third wireless device, compare the determined AoA of the received first wireless signal to a predefined range of allowable AoA values that define the cone of allowable values for the third wireless device centered about and extending outward from all sides of the reference vector extending from the position of the third wireless device to determine if the AoA of the received first wireless signal is within the cone of allowable AoA values for the third wireless device, and establish an authenticated wireless connection between the third and second wireless devices and deny an authenticated wireless connection between the first and second wireless devices only if the AoA of the received first wireless signal is within the cone of allowable AoA values for the third wireless device while at the same time the AoA of the received first wireless signal is not within the predefined cone of allowable AoA values for the first wireless device.

24. The method of claim 23, where the first and third devices are each a fixed device, and where the cone of allowable values for the first wireless device does not overlap with the cone of allowable values for the third wireless device.

\* \* \* \* \*